United States Patent
Baychar

(10) Patent No.: US 7,314,840 B2
(45) Date of Patent: Jan. 1, 2008

(54) WATERPROOF/BREATHABLE, MOISTURE TRANSFER, SOFT SHELL ALPINE BOOTS, AND SNOWBOARD BOOTS, INSERT LINERS AND FOOTBEDS

(75) Inventor: Baychar, Eastport, ME (US)

(73) Assignee: Solid Water Holdings, Eastport, ME (US)

( * ) Notice: Subject to any disclaimer, the term of this patent is extended or adjusted under 35 U.S.C. 154(b) by 0 days.

(21) Appl. No.: 11/341,374

(22) Filed: Jan. 30, 2006

(65) Prior Publication Data

US 2006/0177645 A1    Aug. 10, 2006

Related U.S. Application Data

(63) Continuation of application No. 10/600,711, filed on Jun. 23, 2003, which is a continuation-in-part of application No. 09/500,535, filed on Feb. 9, 2000, which is a continuation of application No. 08/910,116, filed on Aug. 13, 1997, now Pat. No. 6,048,810, which is a continuation-in-part of application No. 08/832,800, filed on Apr. 4, 1997, now abandoned, which is a continuation-in-part of application No. 08/747,340, filed on Nov. 12, 1996, now Pat. No. 5,738,937.

(51) Int. Cl.
*D04H 5/18* (2006.01)
*D04H 5/24* (2006.01)
*B32B 3/26* (2006.01)

(52) U.S. Cl. ............... 442/370; 428/304.4; 428/316.6; 36/44; 36/117.3; 36/30 R

(58) Field of Classification Search ............... 428/34.1, 428/90, 304.4
See application file for complete search history.

(56) References Cited

U.S. PATENT DOCUMENTS

| 3,020,169 A | 2/1962 | Phillips, Jr. et al. |
| 3,366,291 A | 1/1968 | Boyer, Jr. |
| 3,570,150 A | 3/1971 | Field |
| 3,607,593 A | 9/1971 | Semenzato |

(Continued)

FOREIGN PATENT DOCUMENTS

EP    0899090    3/1999

OTHER PUBLICATIONS

Olympia Sports Catalog, Olympia Performance Gloves, 1993, pp. 2-8.

(Continued)

*Primary Examiner*—Terrel Morris
*Assistant Examiner*—Matthew D. Matzek
(74) *Attorney, Agent, or Firm*—Mattingly, Stanger, Malur & Brundidge, P.C.

(57) ABSTRACT

The waterproof/breathable moisture transfer liner for alpine, snowboard and hiking includes an inner liner selected from technically advanced fabrics which are carefully selected. A series of layers are provided outside the inner liner including foam material and insulated nonwoven layers, breathable membranes, a supportive mesh included in a moldable foam, or moldable a spacer material and an outer shell fabric. The applicability of the liner to alpine boots, snowboard boots, cross country boots, hiking boots, protective gear, helmets, bouldering shoes, paddling apparel and gear along with appropriate variations for each application are disclosed.

9 Claims, 21 Drawing Sheets

U.S. PATENT DOCUMENTS

| | | |
|---|---|---|
| 3,616,170 A | 10/1971 | Closson, Jr. |
| 3,779,855 A | 12/1973 | Fonzi et al. |
| 3,839,138 A | 10/1974 | Kyle et al. |
| 3,961,124 A | 6/1976 | Matton |
| 4,015,347 A | 4/1977 | Morishita et al. |
| 4,050,491 A | 9/1977 | Hargrove |
| 4,216,177 A | 8/1980 | Otto |
| 4,245,410 A | 1/1981 | Molitor |
| 4,287,629 A | 9/1981 | Stalteri |
| 4,338,366 A | 7/1982 | Evans et al. |
| 4,338,371 A | 7/1982 | Dawn et al. |
| 4,454,191 A | 6/1984 | Blucher et al. |
| 4,482,593 A | 11/1984 | Sagel et al. |
| 4,524,529 A | 6/1985 | Schaefer |
| 4,529,641 A | 7/1985 | Holtrop |
| 4,594,283 A | 6/1986 | Ohigashi |
| 4,599,810 A | 7/1986 | Sacre |
| 4,621,013 A | 11/1986 | Holtrop et al. |
| 4,656,760 A | 4/1987 | Tonkel et al. |
| 4,662,006 A | 5/1987 | Ross, Jr. |
| 4,666,765 A | 5/1987 | Caldwell |
| 4,674,204 A | 6/1987 | Sullivan et al. |
| 4,729,179 A | 3/1988 | Quist, Jr. |
| 4,756,958 A | 7/1988 | Bryant et al. |
| 4,805,319 A | 2/1989 | Tonkel |
| 4,816,328 A | 3/1989 | Saville et al. |
| 4,823,407 A | 4/1989 | Phillips, Jr. et al. |
| 4,845,862 A | 7/1989 | Phillips, Jr. et al. |
| 4,894,932 A | 1/1990 | Harada et al. |
| 4,909,523 A | 3/1990 | Olson |
| 4,910,886 A | 3/1990 | Sullivan et al. |
| 5,004,643 A | 4/1991 | Caldwell |
| 5,010,596 A | 4/1991 | Brown et al. |
| 5,021,280 A | 6/1991 | Farnworth et al. |
| 5,035,943 A | 7/1991 | Kinlaw et al. |
| 5,043,209 A | 8/1991 | Boisse et al. |
| 5,073,298 A | 12/1991 | Gentle et al. |
| 5,075,343 A | 12/1991 | Blount |
| 5,092,614 A | 3/1992 | Malewicz |
| 5,098,778 A | 3/1992 | Minnick |
| 5,126,182 A | 6/1992 | Lumb et al. |
| 5,134,017 A | 7/1992 | Baldwin et al. |
| 5,154,682 A | 10/1992 | Kellerman |
| 5,169,712 A | 12/1992 | Tapp |
| 5,171,033 A | 12/1992 | Olson et al. |
| 5,209,965 A | 5/1993 | Caldwell |
| 5,216,825 A | 6/1993 | Brum |
| 5,224,356 A | 7/1993 | Colvin et al. |
| 5,253,434 A | 10/1993 | Curley, Jr. et al. |
| 5,269,862 A | 12/1993 | Nakajima et al. |
| 5,277,954 A | 1/1994 | Carpenter et al. |
| 5,290,904 A | 3/1994 | Colvin et al. |
| 5,330,208 A | 7/1994 | Charron et al. |
| 5,340,132 A | 8/1994 | Malewicz |
| 5,342,070 A | 8/1994 | Miller et al. |
| 5,364,678 A | 11/1994 | Lumb et al. |
| 5,365,677 A | 11/1994 | Dalhgren |
| 5,366,801 A | 11/1994 | Bryant et al. |
| 5,378,529 A | 1/1995 | Bourdeau |
| 5,380,020 A | 1/1995 | Arney et al. |
| 5,397,141 A | 3/1995 | Hoshizaki et al. |
| 5,398,948 A | 3/1995 | Mathis |
| 5,400,526 A | 3/1995 | Sessa |
| 5,415,222 A | 5/1995 | Colvin et al. |
| 5,418,051 A | 5/1995 | Caldwell |
| 5,431,970 A | 7/1995 | Broun et al. |
| 5,437,466 A | 8/1995 | Meibock et al. |
| 5,439,733 A | 8/1995 | Paire |
| 5,452,907 A | 9/1995 | Meibock et al. |
| 5,456,393 A | 10/1995 | Mathis et al. |
| 5,499,459 A | 3/1996 | Tomaro |
| 5,499,460 A | 3/1996 | Bryant et al. |
| 5,503,413 A | 4/1996 | Belogour |
| 5,544,908 A | 8/1996 | Fezio |
| 5,566,395 A | 10/1996 | Nebeker |
| 5,575,090 A | 11/1996 | Condini |
| 5,637,389 A | 6/1997 | Colvin et al. |
| 5,677,048 A | 10/1997 | Pushaw |
| 5,682,613 A | 11/1997 | Dinatale |
| 5,727,336 A | 3/1998 | Ogden |
| 5,738,937 A | 4/1998 | Baychar |
| 5,763,335 A | 6/1998 | Hermann |
| 5,775,006 A | 7/1998 | Breuner |
| 5,785,909 A | 7/1998 | Chang et al. |
| 5,787,502 A | 8/1998 | Middleton |
| 5,876,792 A | 3/1999 | Caldwell |
| 5,932,299 A | 8/1999 | Katoot |
| 5,970,629 A | 10/1999 | Tucker et al. |
| 6,004,662 A | 12/1999 | Buckley |
| 6,048,810 A | 4/2000 | Baychar |
| 6,065,227 A | 5/2000 | Chen |
| 6,074,966 A | 6/2000 | Zlatkus |
| 6,200,915 B1 | 3/2001 | Adams |
| 6,237,251 B1 | 5/2001 | Litchfield et al. |
| 6,474,001 B1 | 11/2002 | Chen |
| 6,474,002 B2 | 11/2002 | Chen |
| 6,479,009 B1 | 11/2002 | Zlatkus |
| 6,602,811 B1 | 8/2003 | Rock et al. |
| 6,604,302 B2 | 8/2003 | Polegato Moretti |
| 6,660,667 B2 | 12/2003 | Zuckerman et al. |
| 6,893,695 B2 | 5/2005 | Baychar |
| 2001/0016992 A1 | 8/2001 | Gross |
| 2002/0012784 A1 | 1/2002 | Norton et al. |
| 2004/0081791 A1* | 4/2004 | Abrams .................. 428/90 |

OTHER PUBLICATIONS

MOTOPORT—1991 Motoport U.S.A. Apparel and Accessory Catalog, 1991.
KAMIK Catalog, 1997.
LaCrosse Catalog, 1997.
Frisby Technologies Test Report—"Insulated Boot Lines Containing Microencapsulated Phase Change Materials", Dec. 12, 1995.
Frisby Technologies Test Report—"Cold Weather Boot Liners Containing COMFORTEMP Foam", Sep. 24, 1996.
"Analytical Modeling of A MicroPCM-Enhanced Diver Dry Suit", U.S. Naval Academy, Technical Report EW-20-96, Aug. 1996.
Soccer Technology Catalog, PUMA, 1992.
OUTLAST Style #1750 (Alpine 1), Product Specification, 1996.
OUTLAST Style #4330 (Alpine 2), Product Specification, 1996.
OUTLAST Alpine TRF3, Product Information Sheet, 1996.
Frisby Technology Documents, No. F001006-F001009, Jun. 1996.
Rodriguez, Ferdinand, "Principles of Polymer Systems", 1982, Hemisphere Publishing Corp., 2nd Ed., p. 362.

* cited by examiner

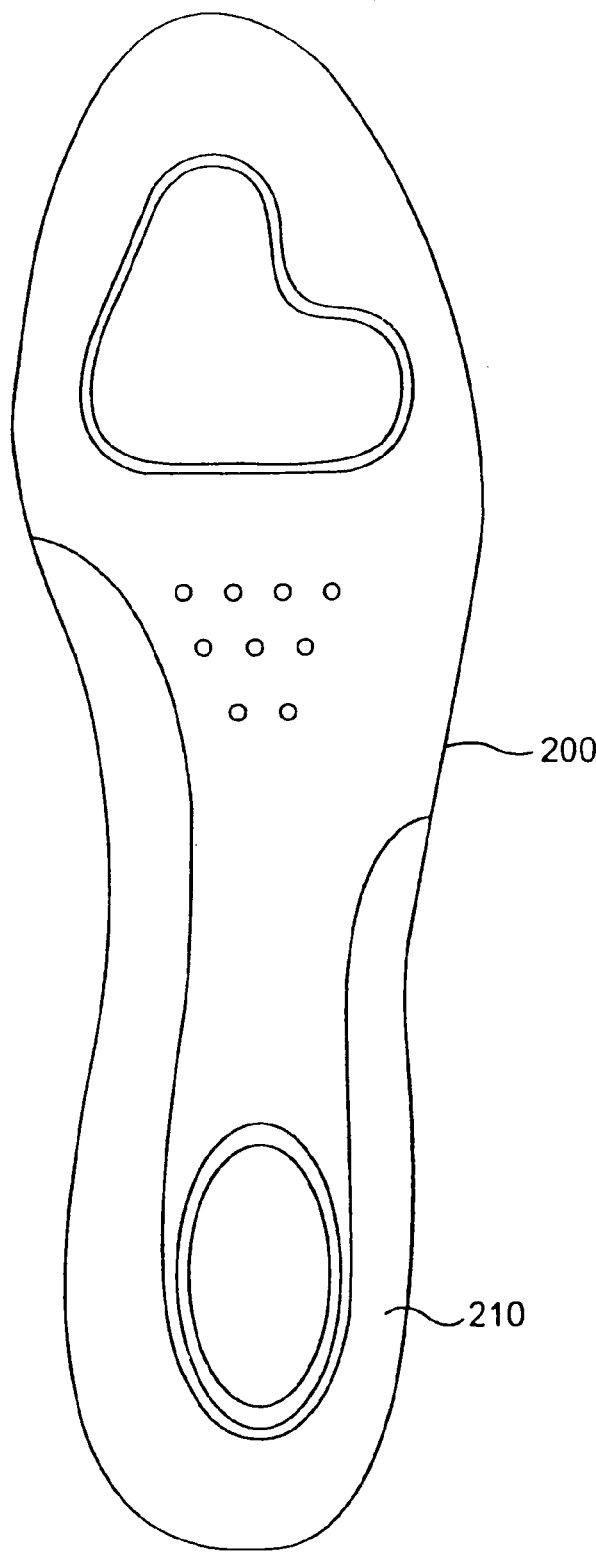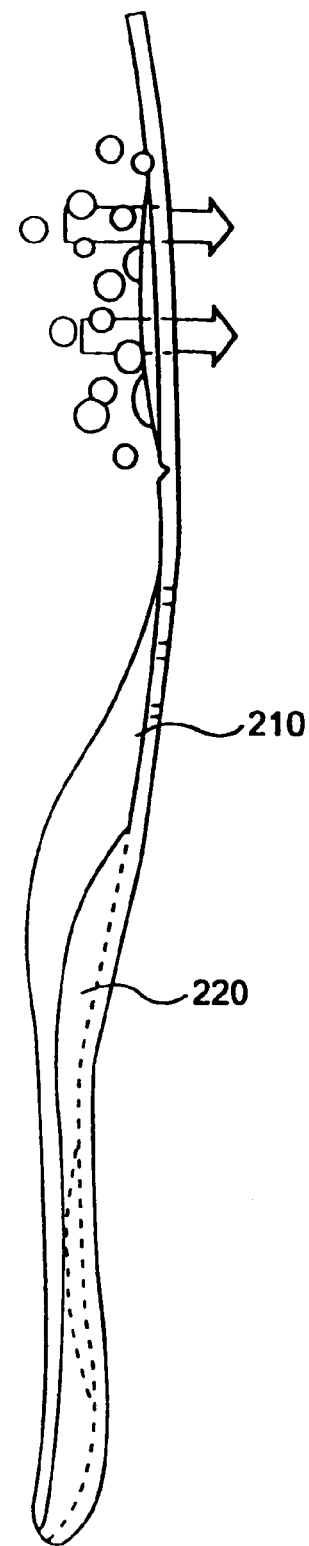
FIG. 5(a)   FIG. 5(b)

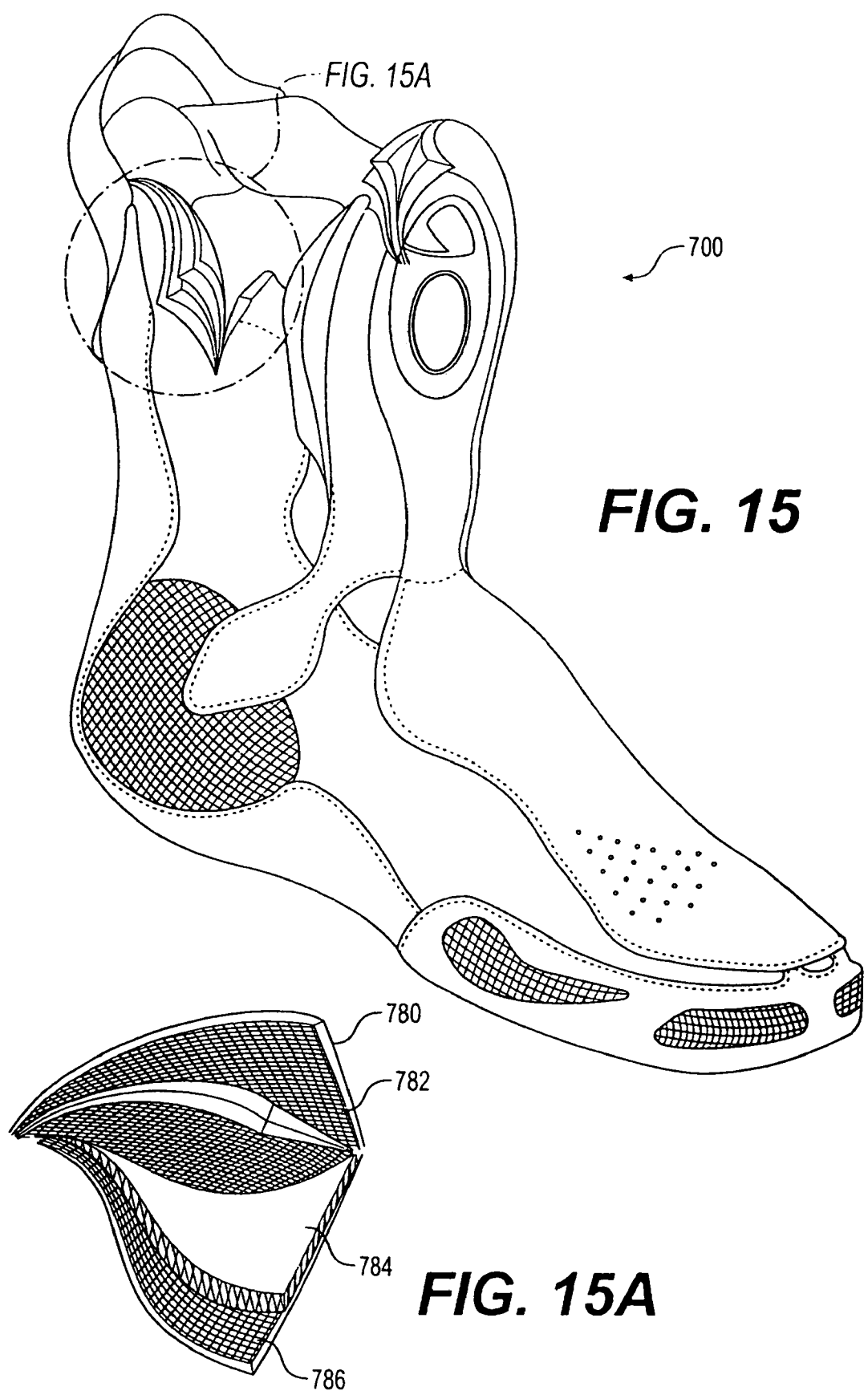

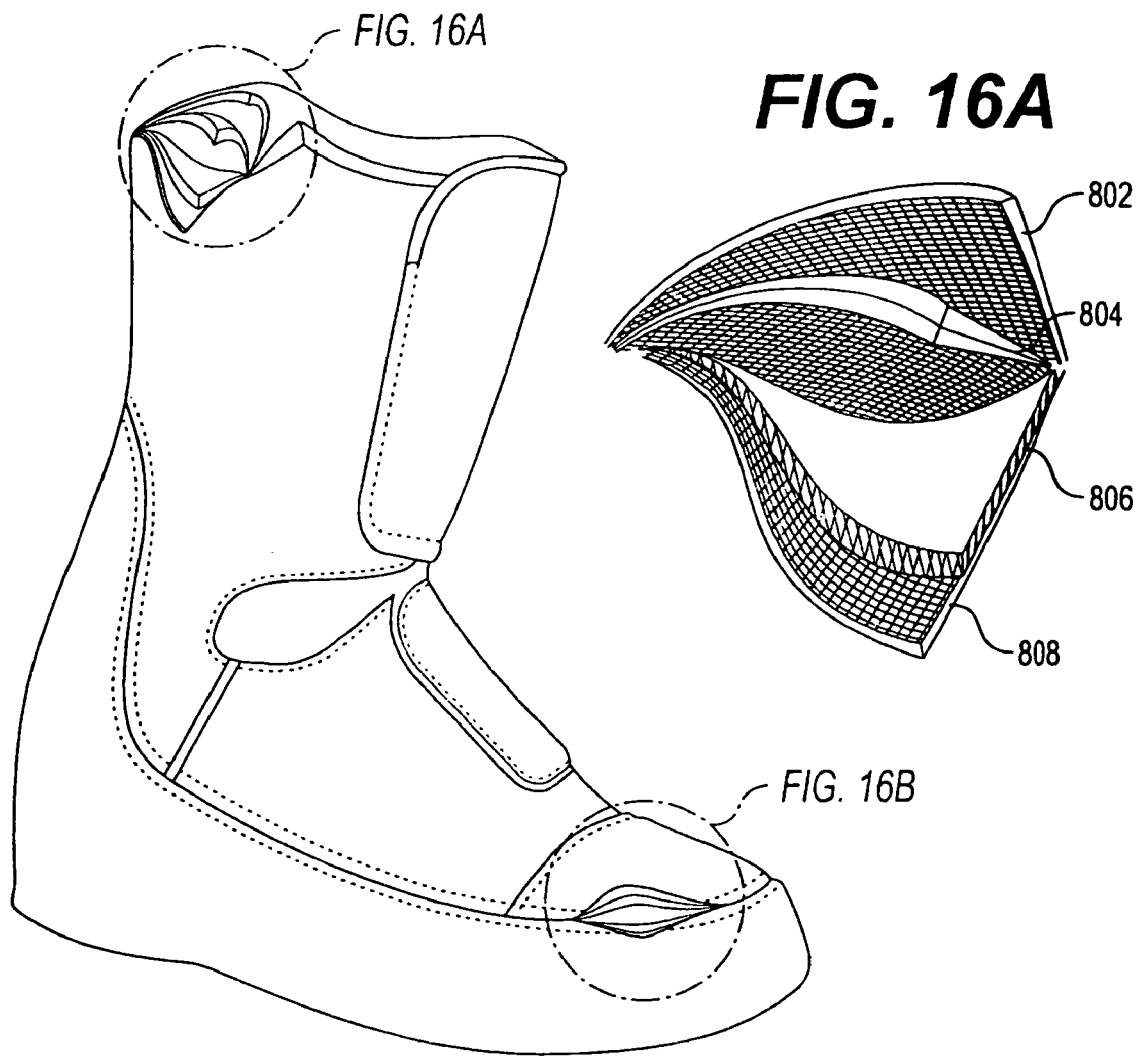
FIG. 16
FIG. 16A
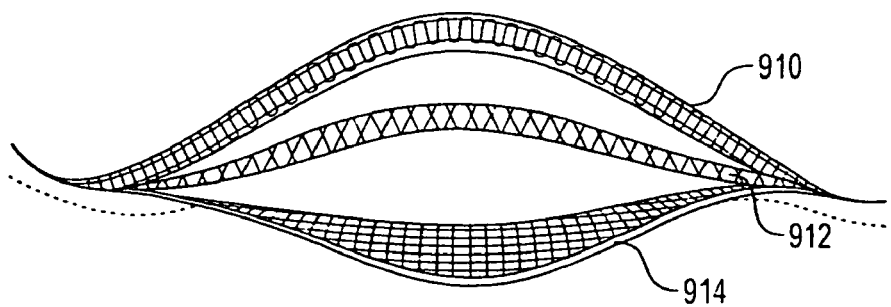
FIG. 16B

WATERPROOF/BREATHABLE, MOISTURE TRANSFER, SOFT SHELL ALPINE BOOTS, AND SNOWBOARD BOOTS, INSERT LINERS AND FOOTBEDS

This is a continuation application of U.S. Ser. No. 10/600,711, filed Jun. 23, 2003, which is a CIP of Application No. 09/500,535, filed Feb. 9, 2000, which is a continuation application of Application No. 08/910,116, filed Aug. 13, 1997 (now U.S. Pat. No. 6,048,810), which is a CIP of Application No. 08/832,800, filed Apr. 4, 1997 (abandoned), which is a CIP of Application No. 08/747,340, filed Nov. 12, 1996 (now U.S. Pat. No. 5,738,937).

FIELD OF THE INVENTION

The present invention relates to liners used in a variety of applications. For example, the liner of the present invention may be employed in a variety of applications including Alpine boot, soft-shell alpine boot light hiking and running shoes and hiking boots. The liner is breathable and transfers moisture to increase comfort for the skier, snowboarder, hiker and the like.

BACKGROUND OF THE INVENTION

Various types of liners are known for the prior art. However, these liners do not provide the advantages realized by the present invention. The present inventor has recognized the problems faced by snowboarders skiers and hikers and developed liners to overcome such problems.

There is an ongoing need for comfort, breathability, and support for the snowboard or alpine lining. In prior designs, a rigid, non-breathable outer material, such as vinyl, foam, and nylon is often used. The inner liners have been leather, synthetic leather, nylon, or polyester blends which extremely limited the ability to breathe or wick moisture away from a rider's body. These materials have also prevented the foot from breathing adequately.

BRIEF DESCRIPTION OF THE DRAWINGS

FIGS. 5(a) and 5(b) illustrate a sole portion of a liner constructed according to a preferred embodiment of the present invention.

FIG. 15 illustrates another embodiment of an insert for an in-line skate or hockey skate with a third portion enlarged.

FIG. 16 illustrates an insert for a soft-shell alpine boot with a first portion enlarged.

DETAILED DESCRIPTION OF THE PREFERRED EMBODIMENTS

The following detailed description of the preferred embodiments of the present invention is undertaken in connection with the drawings. This description, while undertaken with respect to the disclosed embodiments, is intended to enable a variety of different applications and slight modifications which form a part of the present invention. More specifically, many of the materials used in this lining system have been developed relatively recently, and in many cases are still being modified and improved. Where possible, tradenames of specific products have been used to assist in the understanding of the invention. The lining system according to the present invention can be easily adapted to accommodate further developments in these materials. For example, while the preferred embodiments are illustratively presented below as a specific sequence of layers, it should be understood that one or more of these layers may be omitted depending upon the specific needs of any application. In other words, it is not strictly necessary to have a certain number of foam layers just as that disclosed in the currently preferred embodiments. This also applies for the other materials that are described. For the sake of conciseness, every possible combination contemplated by the inventor is not specifically described. With this in mind, the preferred embodiments currently envisioned are set forth below.

Figure 1:
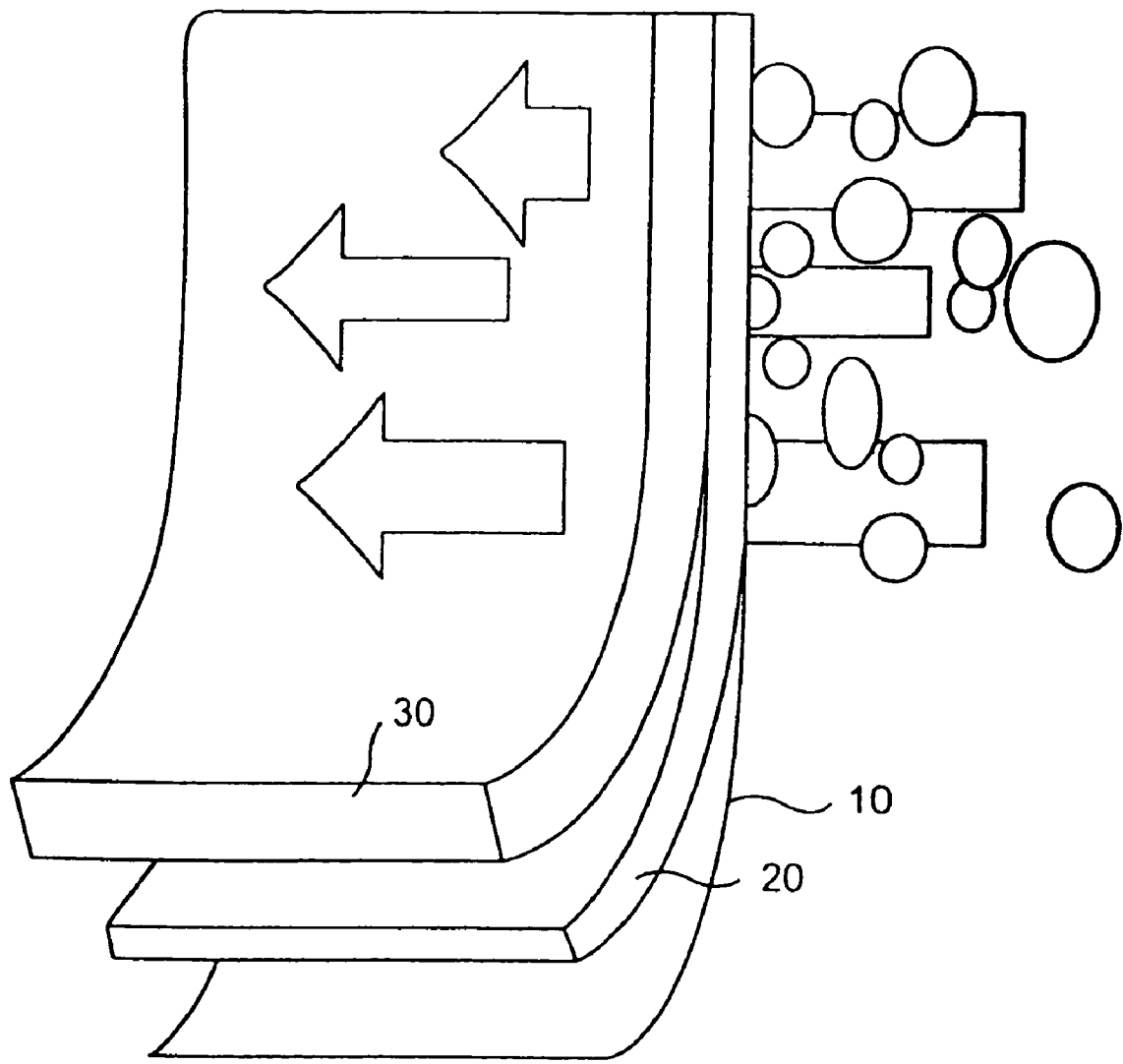
FIG. 1 illustrates a first portion of the liner according to a first embodiment of the present invention.

FIG. 1 illustrates a portion of the liner, or lining system, according to a first embodiment of the present invention. This embodiment is directed to a liner for a snowboard or alpine boot which is generally removable. The liner may be non-removable in some embodiments and may the entire boot. The various layers of materials discussed below can be attached to one another in a number of ways, particularly by lamination, mechanical bonding (or stitch bonding such as that done by Tietex, Inc., NONWOVENS INC., Foss Manufacturing or XYMED GROUP etc.) or a combination of lamination and mechanical bonding. Mechanical bonding can be performed using synthetic or natural fiber threads with or without the antimicrobial silver fibers, or the like. Mechanical bonding may be achieved by utilize the internal fibers from the nonwoven. A nonwoven blend with or without silver fibers and may be flocked into the open cell foam or the nonwoven composite may be laminated to the open cell. Hot Air or cold welding may be used in all applications to attacked the layers of the composites. As shown in FIG. 1, a first foam material (20) is provided between an inner liner material or knit or (10) and a nonwoven attached to a second foam material (30). The inner liner (10) can be attached to the first foam, nonwoven or cellular elastomeric material (20) by lamination, mechanical bonding, welding or the like. The second foam material (30) is a germicidal, reticulated and or/open cell foam and has a thickness of approximately 1/32 TO 1/4 inch. All of the foam materials used in the present invention are assumed to be breathable and hydrophilic in nature or by treatment. A hydrophobic foam may be selected if it is breathable. All foams may be treated with a hydrophilic foam coating, or a wicking solution to increase the moisture transfer properties and their thicknesses can be varied depending upon specific needs. All foams may include silver fibers, nonwovens and nonwovens blends with or with out foam by Foss Manufacturing. Alternatively, some of the foam materials can be replaced with a germicidal, hydrophilic open-cell foam mechanically bonded to nonwoven fibers. For example, a foam (made by Foamex) may be used in combination SSOFTHERM, a blend by Foss inclusive of antibacterial silver fibers and shaped polyester fiber. Preferably, a four deep grove polyester fiber or a variation of a shaped polyester is combined with lyocel, pva, wool or a blend. Optionally, a shape synthetic fiber such as corn, acetate, acrylic, or the like is wrapped in another natural or synthetic fiber or blend of synthetic fibers. The combinations lend endless possibilities to the performance criteria. Preferably, an open cell or the like or a hydrophilic foam by Dicon is attached to a moisture transfer nonwoven top sheet made of wood pulp, corn, polyester, nylon, cotton, rayon, wool polypropylene, LYCRA, elastine fiber, lyocel, kapok, acrylic, acetate or a combination of these, etc. The nonwoven selected fibers may be included in the open cell hydrophilic foam such as that by Dicon, Foamex or the like. All Dicon foam and the like can include silver fibers or a blend of fibers.

All synthetic and natural fibers may additionally be included in the foam formation or fused together in the elastomeric composite with water pressure. Alternatively, the nonwoven fiber blends, with or without the silver fibers, may be flocked into selected open cell foam and can be added to any foam, nonwoven, or fabric layer. All nonwovens in this embodiment are believed to aid in the transfer of moisture through absorption and transfer moisture (wicking) or a combination of both moisture management mechanisms. The nonwoven has the option to be treated with COFOAM by Hydrophilix Inc., a patented process of coating a hydrophilic foam on fibers, nonwovens, fabrics, foams and materials.

Synthetic fibers for the most part are hydrophobic and encourage moisture vapor and moisture to flow along, around and over but not through the fibers so as to be carried away for evaporation. This process is called "wicking". Natural fibers and some synthetic fibers are hydrophilic and draw moisture vapor or moisture into themselves. In combinations these fibers both absorb and wick moisture away. Independently, both natural and synthetic fibers encourage the movement of moisture vapor. Many of these nonwoven fibers may be chemically modified to increase their moisture transfer characteristics with wicking or ionized solutions.

The inner liner (10) is preferably constructed using specific fabrics possessing certain desired characteristics. A list of fabrics which can be employed depending upon the individual needs of their application as well as the individual needs of each person are provided below. These fabrics may either be used individually or in combination and can be double sided with one fiber on one side and another on the other side. Variations for use in an insert liners and composites for snowboard, alpine, hockey and in-line skates shell boots or the like. The soft-shell boot, moisture transfer composites are combined with a polymer skeleton framework. The moisture transfer liner is inserted into the moisture transfer soft-shell boot and are specifically recited. The soft-boot insert liner requires that the external shell material be combined with a polymer skeleton framework.

The first fabric is an anti-microbial, anti-fungal fleeced polypropylene (also referred to as polyolefin) LYCRA blend (2%) with INNOVA fiber, or the like. INNOVA is a continuous filament fiber (manufactured by Deercreek Fabrics, Inc., Coville or Menra Mills). Polypropylene is noted for its excellent inherent moisture transfer characteristics.

All polyester or polypropylene fabrics made by Coville, Inc. or Deercreek Fabrics are treated with TRANSPOR DRY FIBER TECHNOLOGY, a wetting solution or the like.

The second fabric is an anti-microbial, anti-fungal polypropylene fleece having a polyester, cotton, acrylic rayon or wool backing, or the like (such as that manufactured by Coville, Inc.) This double sided fabric combines two moisture management mechanisms, wicking and absorption. The wickable synthetic fiber pushes the moisture away and the cotton, rayon etc. pulls the moisture up from the inner layer and spreads it out for transfer and evaporation. This double sided fabric may be used for winter hiking or climbing boots and various alpine boots, the backing made of polyester or cotton blends can be replaced with either natural or synthetic blends of fibers such as wool, cotton, silk, acetate, acrylics, tencel, rayon, polyester, corn or kapok fibers or the like.

The third inner lining material may be a nonwoven such as that made by Freudenberg called Vildona or Evolon made from microdenier polyester, nylon synthetic blends or nonwovens made of natural fibers and natural fiber blends such as cotton, kapok, wood pulp and by-products such as those by NatureWorks called (PLA) CORNUCOPIA made from a corn fiber.

The fourth fabric is an anti-microbial, anti-fungal polypropylene/cotton blend with ALPHA fiber (such as that manufactured by Intex Fabrics, Inc. or the like).

The fifth fabric is a FIELDSENSOR polyester with waffle weave construction (such as that manufactured by Toray and distributed by Yagi & Co., Inc.). Alternatively, a polyester material known as AQUA-DRY, manufactured by Teijin Shojin can be employed.

The sixth fabric is a hydrophilic anti-microbial DRI-LEX BABY KID, DRI-LEX nylons or perforated material (such as that manufactured by Faytex Corp.)

The seventh fabric is a polyester looped terry (such as that manufactured by Kronfli Spundale Mills, Inc.).

The eighth fabric is a sueded/sanded fleeced polyester microfiber material (distributed by Yagi & Co., Inc. and Teijin Shojin, Inc.).

The ninth fabric is POLAR TEC SERIES 100, 200 and POLARTEC POWERSTRETCH which is a wickable, moisture transfer fiber, containing LYCRA and polypropylene. This fabric is also anti-microbial.

The tenth fabric is a moisture transfer fabric CERAMIC FLEECE by Calamai.

The eleven fabric is a wool blend with a cotton, polyester, or the like backing.

The twelfth fabric is an acrylic-based conductive fabric from Sterling Performance.

The thirteenth fabric is a nylon or nylon polyester blend possibly treated with TRANSPORT DRY FIBER technology manufactured by Gilford Mills.

The fourteenth fabric is a spacer fabric constructed of nylon, polyester, or polypropylene blend.

The fifteenth type of fabrics are selected chemical and naturally ionized synthetic fabrics and fibers such as (MICROSAFE ACETATE, MICROSUPREME ACRYLIC CYSTAR, BIOFRESH and the like manufactured by Celanese Acetate, Sterling Performance Fabrics, MICROSUPREME HIGH TECH ACRYLIC by Sterling Performance fabrics.

The sixteenth type of fabrics are ACRILLIAN or DURASPUN acrylics performance fabrics by Monsanto or blends of acrylics and polyester by Glenoit, or the like.

The seventeenth fabric is blend of performance fibers and TEFLON or FREELON blend of Friction Free Technology by Concept III.

The eighteenth fabric is a new blend of corn fabrics or corn and cotton fibers with wool by Draper Knitting.

The nineteenth fabric is peppered fleece a combination of cotton, acrylic or cotton, acrylic and polyester The twentieth fabric is KWILL fleece by Concept III.

The twenty-first fabric is K-WICK by Kronfli Spundale Mills.

The twenty-second fabric is MICROLANA MICROFABRIC by Glenoit.

The twenty-third fabric is MICROSUPREME HIGH TECH ACRYLIC by Sterling Performance Fabrics blends of acrylic, cotton and polyesters fleeced fabrics.

The twenty-fourth fabric is NANO-DRY by Nan-Tex, a blend of cotton and synthetics.

The twenty-fifth fabric is DRI-RELEASE by Concept III Textiles.

The twenty-sixth fabric is by Dyersburg called DYERTECH.

The twenty-seventh fabric is DRYLINE by Milliken a hydrophobic polyesterand LYCRA.

The twenty-eighth is SWEET a polyester fabric by Tapetex.

The twenty-ninth is a polyester and polypropylene fabric blend by Coville, preferably COMFORTREL. Also preferred are moisture transfer knits by Coville and blends of cotton and polyester and/or polypropylene, preferably HIGHLANDER-PLUS or POLYGON STRETCH.

The thirtieth fabric is cross-dye POWER DRY and SMART FIBER fabrics by Wellman.

The thirty-first fabric is MICROMOVE by Burlington.

The thirty-second are polyester fabrics and blends by Kronfli.

The thirty-third is M.C.S. WITH NANO DRY.

Finally, spacer fabrics or fleeced fabrics of polyester or polyester blends manufactured by Malden Mills and others can be used.

All synthetics and natural fibers and fabrics may have the option to be treated with Phase Change Technology. The addition of the Phase Change Technology to melt blown fiber is presently marketed by OUTLAST as THEMOCULE or by Freundenberg Nonwoven. The OUTLAST/DTI meltblown spun bond fiber, Freudenberg Nonwoven thermal fibers with Phase Change, Thinsulate or Thinsulite with Phase Change Technology or ThemoSense by Wisconsin Global Technology is an option in any layer in this system. All thermal layer with or with out Phase Change Technology may include silver fibers and may be ionized with addition fibers or a chemical solution to increase moisture transfer. The synthetic or natural fibers in the inner lining layer 10, may be treated with Transfer Dry Fiber Technology, Intera Technology or any wicking solution that increases moisture transfer capabilities. Alternatively, chemical ionized solutions may be applied to any layer or layers in the system to increase the moisture transfer properties of layers. Chemically ionization of synthetic fabrics involves permanently placing a slight charge in a fabric after the solution is applied. A combination of chemically ionized or wetting solutions may be applied to the any fibers, fabric or foam in the liner system to enhance the moisture transfer performance of the fabric. Micro-spheres or micro-encapsulated polymer sphere technology may be added to any fiber, fabric, nonwoven, foam, coating, membrane or treatment in this liner system. The spheres may be formed from a synthetic polymer such as corn, acrylic, silca, wax, silver fibers or the like or the may be wrapped fiber or foam. The encapsulated micro-spheres or micro-spheres may contain air, wax or a number of solutions that assist in regulating temperature and are developed with materials to assist in the absorption and/or moisture transfer.

A preferable option to the inner lining fabric is a moisture transfer nonwoven or elastomeric composite blend by FoxRun Technologies (U.S. Pat. No. 6,074,966, the disclosure of which is hereby incorporated by reference) with natural or synthetic fibers. The elastomeric composite is made in one process and includes foam and fibers fused together with water pressure. The elastomeric composite may contain any of the fibers mentioned as well as the antimicrobial silver fibers or treatments. The elastomeric fibers may be treated with wicking solutions, chemically ionized, or fiber or fiber blends may be wrapped around individual fibers in the elastomeric to increase the moisture transfer and/or absorption, thermal values, flexibility, tear strength or other performance properties. The elastomeric composite may be welded or needled to an abutting foam or a moisture transfer composite of foam and a nonwoven or SSOFTHERM blend or a SSOFTHERM blend with foam (THERMALFOSS), nonwoven thermal with foam such as Thermolite, Thinsulite, or the like. Thermolite fibers or fibers by DuPont/DTI, 3M, Freudenberg, Alhstrom or Kosa may be included in the SSOFTHERM or Foss composites. Alternatively, the thermal composite may be constructed with fibers from DuPont, GORE, Toray or 3M thermal nonwoven products with or without thermal melt-spun fibers and/or Phase Change Technology and open cell foam or elastomeric composite. The fibers include the above mentioned fibers with or without an antimicrobial fiber added. HOLOFIBER by Wellman may be include in the nonwoven or elastomeric composite. The HOLOFIBER, silver fibers and/or shaped lobed fibers by F.I.T., or the like, may also be introduced into the foam or composite foam layers. The elastomeric composite and nonwoven composites may contain split thermal fibers. Alternatively, the elastomeric composite may be needled into the foam, nonwoven composite or the THERMALFOSS nonwoven blend manufactured by Foss Manufacturing, Thinsulate, DuPont, GORE, Freudenberg, Toray or 3M thermal fibers, or the like. The thermal fibers or nonwoven products by DuPont or 3M such as Thermolite or THINSULATE nonwoven groups maybe be mechanically bonded, welded or laminated to the Foss thermal composite blend or a single layer in the Foss nonwoven composite may be used as a scrum on one side or both sides of the Thinsulate or Thinsulite products.

Alternatively, a wet-laid or spun-bond nonwoven comprised of the synthetic fibers, natural fibers or a blend may be mechanically bonded to the thermal nonwoven with or without open cell foam or an open cell foam, nonwoven and foam composite or a combination of one or more. Optionally, The cellular elastomeric composite may be combined with the thermal nonwoven in some performance categories.

An example of one preferable embodiment would constitute a thin layer of the shaped or lobed polyester fiber or polyester blend mechanically bonded to a Thinsulite or 3M nonwoven product, DuPont thermal nonwoven, Gore, Freudenberg, Toray or another thermal nonwoven or the like. The wet-lay or spin bond nonwoven or nonwoven scrum provided a moisture transfer top sheet to one side or both of the thermal nonwoven. The thin layer of nonwoven fibers may be apertured. A elastomeric composite may replace this thin nonwoven layer or a composite of fiber blends inclusive in an open cell foam suggested may be substituted for nonwoven scrum on one side or both of the thermal nonwoven or foam layers in this liner system. In another embodiment a nonwoven apertured wet-laid fiber or spun bond blend is applied to the Foss composite, 3M or GORE, Toray, Freudenberg, DuPont nonwoven products on one or either side. The selected fibers may be treated with wicking solutions, chemical ionization or may be wrapped fiber combinations. Of course, the thermal nonwoven may utilize neither the nonwoven top-sheet, foam with fibers blends or elastomeric composite in this application.

Thermal nonwoven layer is one of the previous combinations is Thinsulite, Themolite, ultralite a blended variation of selected fibers or the like, SSOFTHERM or the Foss composite blend.

The Thinsulite 3M's line of thermal nonwovens or the DuPont thermal nonwovens may be altered to contain one or more of the following fibers; silver fibers, lobed polyester fibers preferably by F.I.T, polyester, lyocel, PVA, rayon, acetate, corn, acrylic or any variation or combination suggested in this application.

The Foss thermal blend with silver fibers and lobed polyesters, PVA, and/or lyocel or wool with or without foam is the preferably option in any of the layers 20,30,50 in this liner system. The Foss or Freudenberg nonwoven or nonwoven composite can abut on one side or both an open cell foam or the inner or exterior shell fabric and can be treated with a wicking solution. In a number of performance categories the Foss nonwoven composite may be treated with a breathable membrane. Optionally, the Foss, Freudenberg nonwoven or the like may include Phase Change fibers Technology or Micro-sphere Technology.

Optionally, the Foss Thermal nonwoven composite may be omitted and the selected nonwoven fibers in the Foss composite may be flocked into the foam layer or layers of the insert lining or outer shell boot composites. In some performance categories the selected nonwoven fibers and/or the shaped or lobed polyester or polyester blended fibers with or without silver fibers are flocked into the foam layer or layers and abut the Foss composite or a thermal nonwovens mentioned above. Optionally, a wet-lay nonwoven preferably aperture, or elastomeric composite containing at least one of the selected nonwoven fibers previously mention and be needled or welded into the foam or thermal composite structures in on either side or both this application. Alternatively, the nonwovens fibers are flocked to the back inner lining or exterior shell material or fabric to increase the moisture transfer properties. In fact, nonwoven fibers and blends may be combined with any layer in this application by lamination, welding, flocking, fusing, or the like.

Selecting the proper materials, fibers, foam and fabric combinations and blends depends upon the needs of each individual riders and skiers. The non-abrasive fabrics moisture, used in the moisture transfer inner liner of the present invention greatly reduces the possibility of trapped thereby protecting the foot from fungus growth and any damage. The anti-fungal, anti-microbial polypropylene (polyolefin) fabrics quickly remove moisture away from the foot. Skin damage is minimized because the polypropylene fabric or the friction-free fibers including Teflon, generic teflon or FREELON. The smooth, continuous surface or a soft micro denier fleece by Deercreek, Coville or the like prevents bacterial build-up which can cause foot odor and fungus. Chemical ionized or wetting solutions maybe combined with the polyolefins and polyester fiber blends to increase performance levels. In further discussion it is important to assess the product and performance criteria required in selecting the materials and moisture transfer composite options.

All of these fabrics have good moisture transfer characteristics and prevent damage to a rider's foot by preventing excessive moisture build-up.

The moisture transfer characteristics of the inner liner (10) causes moisture vapors to pass from a rider's foot through the inner liner (10) where it then comes into contact with the first foam, nonwoven or nonwoven and foam composite (20). The moisture vapors travel through the first foam, nonwoven or nonwoven and foam composite (20) and comes into contact with a second foam, nonwoven or composite material (30). Preferably, layer 30 can be composed of the moisture transfer nonwoven blend by Foss Manufacturing, Freudenberg, GORE, or the like needled together with an breathable open cell foam. The nonwoven may be a spun bond or wet-lay preferably attacked to the foam by lamination or mechanically bonded. In some applications stitching or welding is preferable. The nonwoven may also be included in the open cell hydrophilic foam such as those recently developed by Dicon Technologies, Foamex or the like. It preferable to add a anti-microbial silver fiber such as those by manufactured by Foss Manufacturing or X-Static.

The nonwoven may be eliminated in some performance categories and layers of foam with or without silver fibers and polymer mesh may abut the inner and exterior shell fabrics or materials. In some options the thermal fibers may be eliminated as well as the open cell foam and a foam substitute made of nonwoven materials may be used.

Preferably, the foam in layer 20 is $1/32$ to $1/8$" is a germicidal, reticulated, hydrophilic, open cell foam developed by Foamex, Dicon or the like) and backed with a nonwoven top sheet comprised of wood pulp, rayon, wool, cotton, corn, polypropylene, lyocel, polyester, flax, acrylic, acetate, elasthane or a combination there of or the like. All the prior nonwoven fibers wick or absorb moisture or both and provide moisture transfer characteristic to the liner system.

The foam material 20 can be attached to the moisture transfer nonwoven top sheet by lamination, stitched, hot welded, flocking or ultrasonically bonded. The moisture transfer nonwoven top sheet (when used) abuts the next layer of $1/32$" to $1/4$" reticulated/hydrophilic flexible polyester, open cell foam, or second foam material or a nonwoven by Foss Manufacturing, Freudenberg, Gore, 3M or Toray, Alhstrom or DuPont or a moisture transfer thermal nonwoven composite 30. Foss nonwoven may optionally, be combined with nonwoven fibers by 3M, Freudenberg Gore or DuPont thermal fibers. Themolite by Dupont, Thinsulite by 3M or the nonwoven by Gore or Freudenberg may contain silver fibers. The second foam material 30 may also be a germicidal, hydrophilic, open cell $1/4$" foam, such as Aquazone, VPF, DRI-Z or the like. The second foam material is preferably backed with a moisture transfer nonwoven top sheet as mentioned above creating alternating layers of foam and nonwoven. As mentioned above these alternating layers of foam and nonwoven fibers transfer moisture regulate temperature, increase performance and develop a moisture transfer system with or without thermal application. The moisture transfer nonwoven top sheet is preferably aperture and the foam is a breathable, open cell foam. The snowboard boot, alpine boot, soft alpine boot and shell boot, climbing and hiking boot liner may utilize the inner composite comprised of alternating layers of foam and nonwovens to trap moisture and prevent it from returning to the inner lining surface. The foam and moisture transfer nonwoven composite combination may be used in numerous locations to absorb and transfer moisture. This foam and moisture transfer composite creates a one-way system that allows moisture to travel only in an outward direction. Also, many of the foam materials are interchangeable depending upon specific performance needs. Optionally, a number of the three and four layer fabric, nonwoven and foam composite combinations may be used for exterior soft-shell boot composite.

The foam materials can be flame laminated to a moisture transfer nonwoven top sheet of cotton, woodpulp, lyocel, corn, kapok, wool, polypropylene or polyester, or a blend thereof. The top sheet is a spun bonded is a wet-lay nonwoven. The wet-lay nonwoven is preferable apertured. The nonwoven top sheet and may be replaced with a woven or knit constructions comprised of synthetic or natural fibers or fiber blends in this embodiment. Wool fibers are an option in this layer. The moisture transfer nonwoven is not to be confused with a moisture transfer thermal composite mechanically bonded nonwoven manufactured, Foss Manufacturing, 3M, Freudenberg, GORE, DuPont or the like. In some performance categories the moisture transfer thermal nonwoven composite may abut the inner moisture transfer fabric and the nonwoven and/or foam composite will be omitted. The Moisture Transfer Thermal composite may also abut an open cell foam or elastomeric composite. The foam layer is a breathable, hydrophilic, open cell foam preferably DuPont, or VPF by Foamex or DRI-Z by Dicon Technologies or the like. The Dicon Technologies open cell foam may optional be developed with glycerin. These foam can also be backed by moisture transfer nonwoven top sheet or abut another open cell foam in a number of performance categories.

An option to the three layers of inner lining material, foam and nonwoven (10, 20, 30) is a lining composite made by Faytex material called DRI-LEX or a liner composite by Dicon Technologies called DRI-Z or a composite by Schoeller Textil call SCHOELLER COMFORTEMP abutting a open cell foam and a nonwoven thermal or spacer fabric material. The DRI-LEX, Schoeller and Dicon composites are comprised of a inner fabric, foam, a nonwoven or knitted top sheet may be added to this system in some embodiments. The Schoeller and or Dicon composites may be with or without the Phase Change Technology. All the composites are believed to be breathable. The addition of the selected nonwoven fiber blends mentioned above with transfer moisture and increase performance. The fabric, foam and nonwoven layers selection by Dicon, Faytex or Schoeller may include in some performance categories.

Alternatively, the first foam material (20) may be a cellular elastomeric composite. The elastomeric composite in layer 20 may be combined with the foam or thermal nonwoven in layer 30. The elastomeric composite is an exceptional moisture transfer composite layer comprised of foam and nonwoven fibers developed by FOXRUN. In one option elastomeric composite may attached to the Foss nonwoven composite with or with out and foam in layer 30 and the inner lining material layer 10. This moisture transfer thermal nonwoven composite manufactured by Foss Manufacturing may replace the alternating layers of foam and moisture transfer nonwovens in layers 30 in some performance categories. This thinner liner option may be used to accommodate the alpine race boot liner. The elastomeric composite is created by fibers fused together with water pressure and can be reviewed in U.S. Pat. No. 6,074,966. The elastomeric is a nonwoven elastomeric web material comprising a hydraulically entangled admixture of a elastomeric foam as a base and a second component of individual natural and/or synthetic fibers subjected to pressured liquid water jets causing entanglement and intertwining of the first component and the second component so as to form an integrated elastomeric web material. The elastomeric may include VPF open cell foam by Foamex.

A split thermal fiber and/or lobed polyester fiber manufactured by Foss Manufacturing and the like maybe combined with the selected fibers in the elastomeric composites in the moisture transfer system. The elastomeric composite can be mechanically bonded or welded to the Foss thermal nonwoven composite, foam composites comprised of alternating layers of open cell foam and moisture transfer nonwovens or spacer fabric for a thinner race boot application, cross country boot or hiking or climbing shoe. Alternatively, the alpine race boot moisture transfer liner may be comprised of inner lining material layer (10) and the Foss thermal nonwoven composite layer (30) abutting a spacer fabric layer by Muller, FoxRun, Hextel or the like and layer (50) the outer fabrics. The elastomeric composite can be inserted between layer 50 and layer 80 to increase moisture transfer to the exterior sheet liner fabric. Optionally, layer 10, 20, and 50 can be used in a helmet liner for snowboard and the like abutting the exterior shell polymer of the helmet.

The Phase Change Technology by Frisby/Schoellar, OUTLAST, Freudenberg, Dicon, Wisconsin Global Technologies and the like may be in combination with the Elastomeric Technology by FoxRun Technologies. The Phase Change Technologies may also be applied to the fibers or foam of the elastomeric composite. The elastomeric composite maybe cold welded or mechanically bonded to the open cell foam or the abutting thermal or spacer fabric. The Phase Change Technology is optional in these elastomeric, foam, thermal or spacer fabric composites and products. The elastomeric may contain thermal fibers by DuPont, Foss, or 3M and may have an antimicrobial silver fiber added in some categories. PRIMALOFT may be an option in this thermal category include with foam and/or foam and nonwoven fibers. The OUTLAST, Frisby Technologies, Schoeller, DTI, Dicon or Freudenberg Nonwovens or the like microencapsulated phase-change materials in fibers, coatings, fabrics, nonwovens or foams can be laminated, welded or mechanically bonded to the outer fabric, nonwoven or to the abutting foam. The Phase Change Technology may be embedded in the encapsulated fabrics or in combination with structurally knitted or woven waterproofed fabrics or nonwovens. The Phase Change technology may be include in fibers flocked to the back of foam or nonwoven materials and may be added to the hydrophilic foam coating by Hydrophilix, Inc. The temperature regulating membrane or coating called OUTLAST, by Gateway Technologies can be inserted between inner layer 10 and the first foam material 20, or applied to the fibers or fabric of layer 10 or the material or composite blend in layer 10. Phase-change fibers may be flocked to the fabric, material, nonwoven or foam layers.

Alternatively, Phase Change Technology can be embedded in the first open cell, hydrophilic foam layer 20 placed in the second foam material 30 or in the abutting or composite if used. The hydrophilic foam is preferably DuPont a flexible polyester, but can be open cell by Dicon or the like or a Frisby product called COMFORTEMP.

The OUTLAST membrane or coating can be placed on the other side foam, outside or on top of the moisture transfer nonwoven top sheet, if present. In fact, Phase Change Technology by OUTLAST or Schoeller, Freudenberg Nonwovens, Dicon Technologies, or Frisby may be combined with any fabric foam, nonwoven or insulated layer and can be on either side. The OUTLAST or Freudenberg Nonwoven melt-blown fibers with Phase Change Technology referenced in patent Ser. No. 09/699,744 and the international counterpart PCT No. US01/41497 or the like can be added to the foam or flocked to the back of the foam, nonwoven and fabrics.

Alternatively, THERMOSENSE by Wisconsin Global Technologies may be applied to the fibers, fabrics and nonwovens in this liner system. THERMOSENSE is a phase change technology.

A number of patents have been issued to Triangle Research & Development Corp. disclosing details related to the processes now being employed by Gateway Technologies and Frisby. For example, U.S. Pat. Nos. 4,756,958 and 5,366,801 are directed to fibers and fabrics with reversible enhanced thermal properties, respectively. The disclosures of these two patents are hereby incorporated by reference. Other patents assigned to Triangle Research & Development Corp., that are related by subject matter and have overlapping inventorship, include U.S. Pat. Nos. 5,415,22; 5,290, 904; and 5,244,356. These patents are also hereby incorporated by reference.

Another patent, U.S. Pat. No. 5,499,460, which has overlapping inventorship with the above-mentioned patents, is directed to a moldable foam insole with reversible enhanced thermal storage properties. The disclosure of this patent is hereby incorporated by reference, and is illustrative of one type of moldable foam that can be used as mentioned herein.

Figure 2:
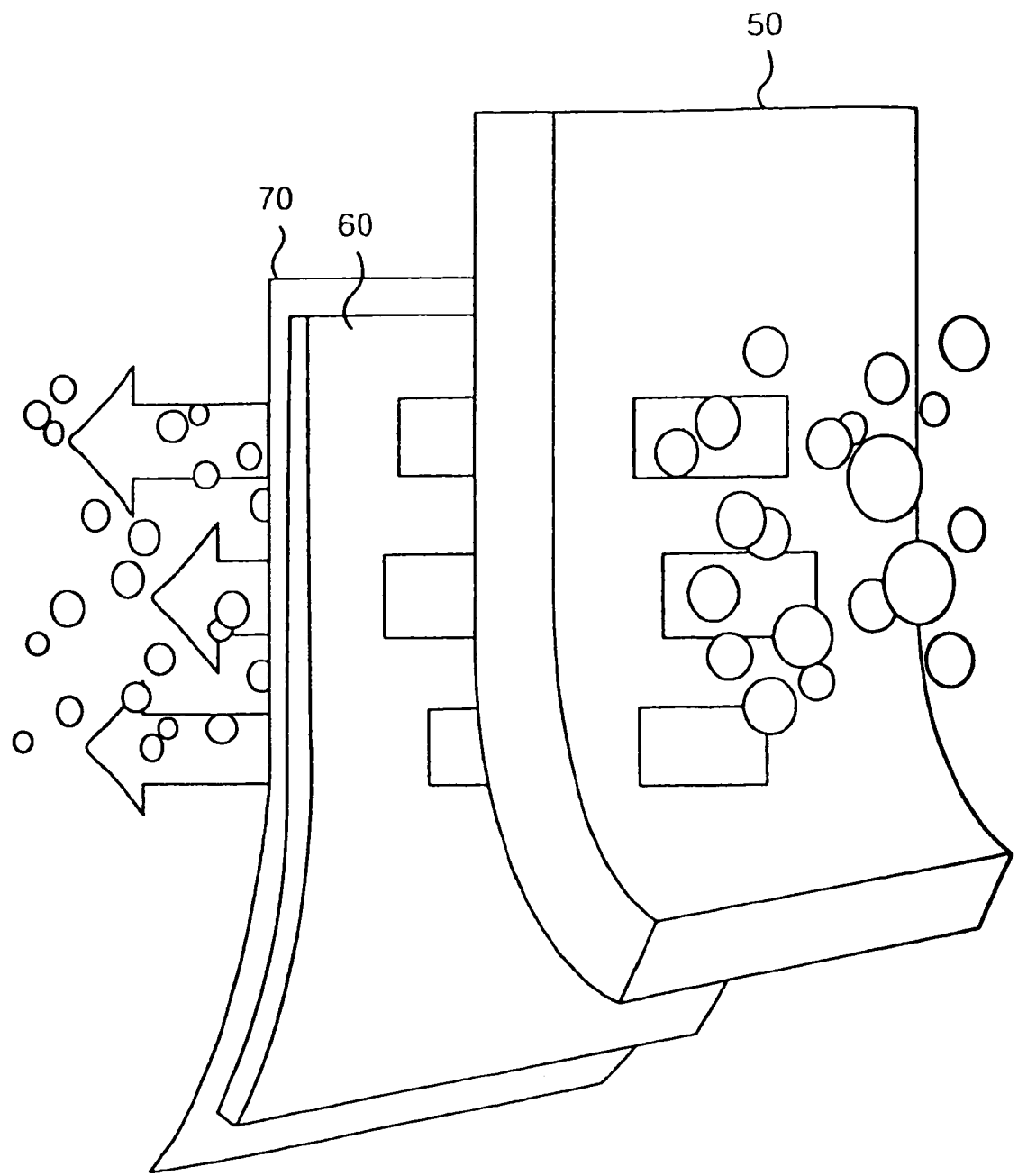
FIG. 2 illustrates a second portion of the liner According to a first embodiment of the present invention.

As shown in FIG. 2, a third foam material 50, which provides support and has similar characteristics to the second foam material 30, allows the moisture vapors to continue their movement toward the outside. This third foam material 50 alternatively can be a moldable foam, Foss nonwoven composite with or without a foam, a foam composite comprised of alternating layers of foam and moisture transfer spun bonded or wet-lay nonwovens, a thermal nonwoven or a thermal nonwoven comprised of moisture transfer nonwoven blended fibers and foam mechanically bonded together. Optionally, a thermal nonwoven such as SSOFTHERM, SSOFTHERM blend, Thermolite, Gore, Freudenberg or 3M thermal fibers insulation materials or the like with or without foam have a performance nonwoven or scrum needled or weld to one side or both sides in layer 50. A breathable spacer fabric or a combination of the composites materials maybe applied to layer 50 in some performance categories. The spacer fabric by Muller or the like, honey-comb spacer material by FoxRun or the like or STYROFOAM is easily molded to take the necessary shapes such as the shape of an ankle, heel cup and foot bones, and is positioned so as to allow the moisture to pass through into subsequent elements and increase comfort and performance levels. Layer 70 is a waterproof/breathable membrane or coating and is optional in this liner system. The breathable ultra thin, micro-porous synthetic membranes or coatings have millions of tiny holes that allow moisture vapor to escape to the outer fabric surface. The permeable, hydrophobic membrane is laminated to the outer shell fabric or abutting foam, thermal nonwoven, or moisture transfer nonwoven. It is not recommended that the membrane or coating be applied to the spacer fabric by Muller or the like. The membranes if applied are preferably hydrophobic with millions of holes or pores built into the surface allowing water vapor and heat to escape. However, breathable hydrophilic membranes may be used in some performance categories. Alternatively, the membrane may be replaced may be a waterproof breathable permeable hydrophobic coating with tiny pores built in applied the shell fabric or material or abutting foam or nonwoven or nonwoven thermal blend.

The waterproof breathable hydrophobic coating is a preferable alternative to the breathable membrane in some performance categories. Optionally, an application utilizing a hydrophilic monolithic or nonporous coating applied to the back of the fabric or nonwoven. The coating allow controlled breathabiltiy in a molecular transfer process. The selected options are MFT, LAYTEK EXELTECH, DUREPEL 1000, ENTRANT GIL, AQUADOR, CELTECH, AQUADOR, SYMPATEX WINDLER, EVENT, SYNTHETIC ELASTIC, ENDURANCE, TRIAD, STORMTEX, ACCUVENT BY ENTERPRISE COATING or waterproof breathable membrane by Gore-Tex (Gore-Tex Immersion Technology) or the like may be applied. The outer layer 80 of the overall lining system can be treated with a waterproof breathable film or finish, a coating, a membrane or a encapsulation by Toray, Nextec U.S. Pat. No. 5,004,643 or the like. The preferable embodiment is the or fiber or fabric encapsulated of the outer fibers fabric preferably by Nextec or Toray. Encapsulation may be applied to the fibers in a layer internally in a fabric. The layer of treated fibers in a fabric maybe on the face, in the middle or in the base of fabric creating varying degrees of waterproofing. The yarns may be coated with silicon or a web layer may be included in a fiber layer in the fabric or the like to waterproof the entire fabric layer as in U.S. Pat. No. 5,004,643, which is hereby incorporated by reference A waterproof breathable DWR finish or film applied to the shell waterproof breathable finish may be applied with an encapsulated fiber in some performance categories. A fabric is alternative option to the encapsulated fabrics. Suggested products such as DURAPEL PLUS, TRAVTECH, HYPER D-WR, ENTRANT G2-XT or eVENT fabrics.

As previously stated layer 50 may be a foam, a foam composite with polymer mesh with or without fiber blends, Foss nonwoven composite or a spacer fabric and may be moldable. The third reticulated/open cell foam or material in layer 50 can be designed to provide a well defined heel lift, and heel pocket. This invention develops the components necessary to increase the technical performance of the products. The increased support and moisture transfer around the heel, toe, and ankle allows the rider to maintain a continuous comfort level during performance. The toe box is from top to bottom, wider and more flexible than in previous alpine or snowboard liners. The laminated or mechanically bonded foams, nonwovens and spacer fabrics under the heel support the rider's lower back and allows for a comfortable stride. With this added comfort, the aggressive or recreational rider's or skier can achieve a higher level of continued performance.

Figure 3:
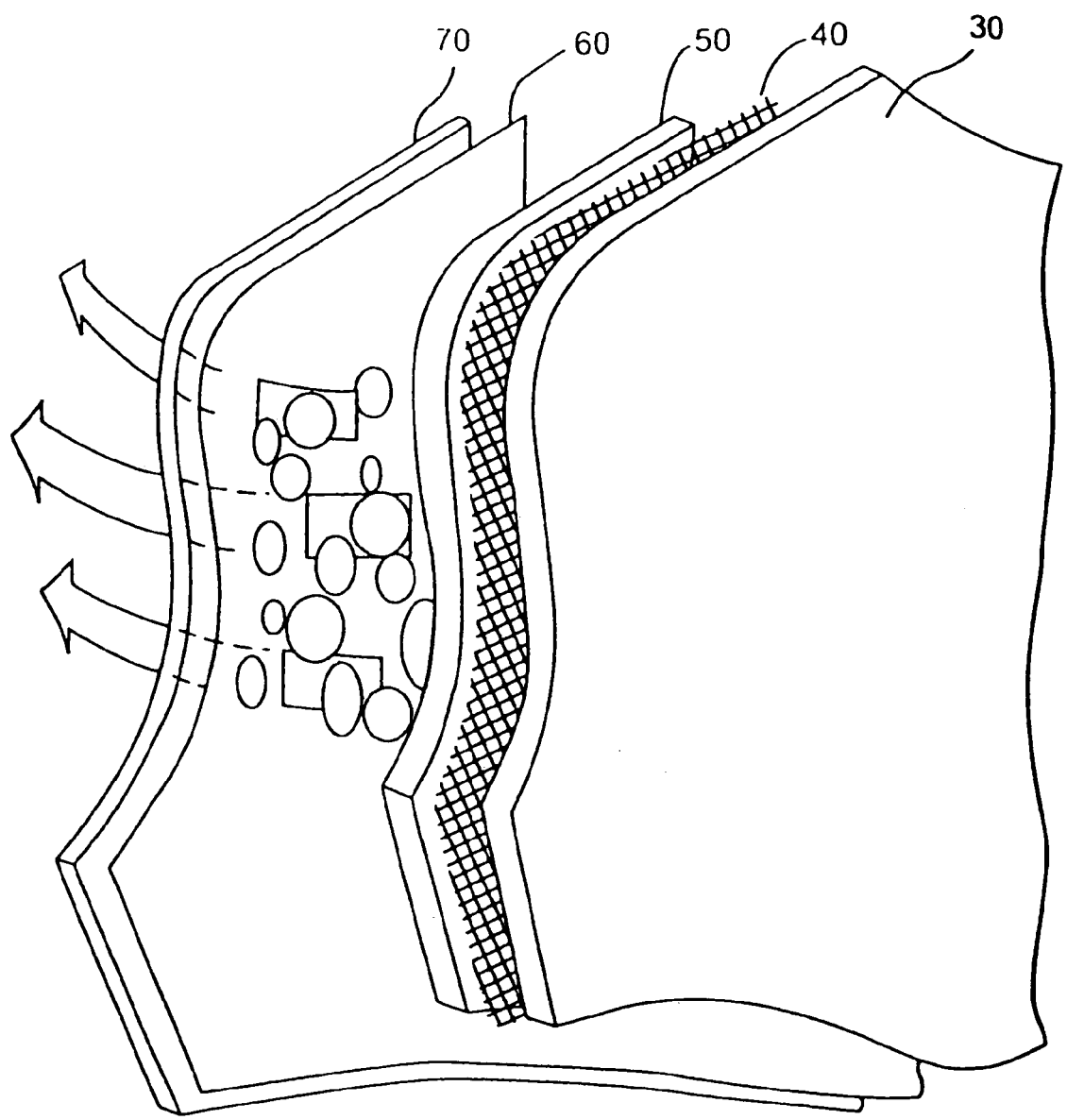
FIG. 3 illustrates an example of the liner according to the first embodiment of the present invention.

As shown in FIG. 3, between the supporting second foam material 30 and the third foam material 50 is a structural mesh 40 which can be a flex guard, for example such as one manufactured by Naltex or Conwed or the like, that adds structural integrity to the lining system. In one option the structural mesh may be include within the foam layer 20,30 or 50 or attacked to the foam or spacer fabric. Alternatively, the structural mesh may be between layer 20 and 80 in some performance categories. The foam including the mesh may be a hydrophilic and open cell foam. The flex guard and foam composite may be used in place of the spacer fabric, moldable foam, thermal composite in layer 50.

The mesh may be applied by lamination or welding to the spacer fabric or foam between layer 50 and 80 or to the third foam layer 50. Also, the mesh may be not used in some circumstances.

A moldable foam such as PORON, if used can be made punctured to allow breathability and moisture transfer in the heel, tongue or toe. Alternatively, the foam can be a reticulated or hydrophilic, open-cell flexible polyester foam structure, or the like in the toe box, heel and ankle pocket. A moisture transfer nonwoven top-sheet (with or without apertures) can be attached to the moldable foam. If a moldable foam or a spacer fabric is used, then the second foam material may be omitted in some thinner applications. Also, the moldable foam can be a hydrophilic foam such as DuPont. As mentioned earlier, the third foam material 50 is preferably similar in construction to the second foam material namely being either germicidal, reticulated and approximately $1/8$ to $1/4$ inch thick, or being germicidal, hydrophilic open-cell (for example DuPont, VPF or DRI-Z). This material is preferably laminated to a moisture transfer nonwoven top sheet (which may or may not be apertured) comprised of corn, polyester woodpulp, lyocel, rayon, kapok, cotton fibers or a blend. The top sheet abuts the waterproof/breathable membrane in layer 70 or waterproof breathable finished, filmed, coated or an encapsulated outer shell fabrics.

It is recommended for extreme sports performance and protective gear products that the moldable foam or spacer fabrics used in place of the breathable flexible mesh and the open cell composite in layer 40. Layer 40 may be also a spacer fabric welded to a flexible mesh or a spacer fabric combined with flexible mesh and foam composite may be combined. The breathable flexible mesh be alternatively incorporated into the open cell foam. The flexible mesh incorporated into the foam in one process creates moldable foam composite and may be used in place of the spacer product. The spacer fabric, or foam nonwoven composite or mesh and foam composite may be combined with the Foss Thermal nonwoven composite for the alpine race boots, ice boots or the like. The nonwoven and foam composite are highly moldable, breathable, and transfer moisture. The spacer fabrics can be of synthetic or natural fiber blends such as those made by FoxRun Technologies and the like. In one options a spacer fabric may abut the inner lining material, or inner lining two layer composite of liner material and foam or lining material, foam and nonwoven blend. Another option includes the inner material, abutting the elastomeric composite on one side and the exterior shell fabric on the other side to create a thin performance liner. The elastomeric composite may be welded or flocked to the inner lining material or shell fabric. A breathable membrane between the exterior shell fabric may be waterproofed with a finish, film, or encapsulation or none of the options may be applied I certain performance categories.

For snowboard, alpine and hiking boots, due to the cold weather conditions, a combination of thermal moisture transfer nonwoven nonwovens, foam composites and spacer fabrics are recommended. THERMOLITE, QUALLOFIL, THERMALOFT, SSOF THERM, THINSULATE, PRI-MALOFT or the like and foam mechanically bonded, or laminated together or a foam composite comprised of a SSOF THERM blend by Foss Manufacturing mechanically bonded together with open cell foam is preferred. An elastomeric composite may be flocked or needed to the thermal nonwovens mentioned above to assist in moisture transfer performance. The Foss nonwoven blended layers without open cell foam may be used in some performance categories. The Foss nonwoven blend maybe an alternative in a number of layers in this moisture transfer breathable system and in some products the open cell foam may include a flexible mesh abutting the nonwoven composite. The Foss nonwoven blend with thermal fibers and foam added is here by referred to called THERMALFOSS. The Foss nonwoven blend, SSOF THERM with or without foam or THERMAL-FOSS may be applied to layer 50 as previously discussed or abut the spacer fabric in layer 50 as layer 30. THERMAL-FOSS is a blend of four deep grove polyester fibers, silver antimicrobial fibers and a combination of the above mention nonwoven fibers. The THERMALFOSS composite may be added between layer 70 or 80 in some performance categories. In applications requiring a thinner composite options, such as in race boot liners, alpine cross country, ice skates, hiking and climbing shoes and boots, bouldering shoes and paddling sports equipment apparel and helmets, accessories the THERMALFOSS may be applied to layer 20, or 30, 40 and abut the inner lining of moisture transfer fabric.

Optionally, the Thermolite or the like or Foss nonwoven composite with or without foam or THERMALFOSS may be mechanically bonded, welded or laminated to a spacer fabric preferably by Muller Textil. An option to the spacer fabrics by Muller Textil or the like are spacer fabrics by FoxRun Technologies. These honey-comb constructed spacer fabrics of synthetic and natural fiber blends are recyclable and environmentally friendly. Spacer fabrics constructed with corn, cotton, flax, kapok, woodpulp, polyesters fibers and the like are preferable. On going research to develop recyclable, bio-degradable alternatives to conventional spacer fabrics is goal of this breathable liner system. Presently, the research by Naturework on by-products of corn fibers and Foxrun on alternative re-cycled polyester and natural fibers and construction are be evaluated for layer 50. A special blend of DuPont fibers and corn fibers with or without foam may be an option in some categories. A thinner option for bouldering shoes, all weather boots, etc. may be the four deep grove polyester manufactured with silver fibers by Foss Manufacturing mechanically combined with a open cell foam and a waterproof mesh. An elastomeric composite with a selected group of previous suggested fibers including wool may also mechanically bonded to the Foss, GORE, 3M or DuPont Nonwoven or the like polyester fibers.

As discussed layer 50 may be a thermal nonwoven such as Thinsulite or Thermolite or the like. Thermolite, manufactured by DuPont, is a thin insulation having a hollow polyester fiber laid in random layers with an acrylic binder (loose felted) needle punched through the cross section to attach layers and tie them down. Various types of Thermolite can be used, such as Thermolite extreme, Thermoloft, Microloft, TFI 2000 G/M2, TFI 4000 G/M2, QUALLOFIL etc. in layer 50 in a number of products and various performance level. The thermal may be mechanically bonded to the spacer fabric by Muller, FoxRun Technologies or the like and can abut layer 70 or 80. In a number of thinner liner options such as a ice skate, hiking shoe, climbing boot, etc., the combined composite of a moldable spacer material and thermal nonwoven composite and may be used abutting the inner moisture transfer fabric or material on one side and the exterior shell fabric on the other. The layered moisture transfer breathable system can be molded in one process. A preferable embodiment for the race alpine boot liner or the hiking shoe develops a three layer inner lining composite abutting the thermal nonwoven or thermal nonwoven composite and the outer shell fabric. Alternatively, a three layer composite consisting of a inner lining fabric, open cell hydrophilic foam and a nonwoven by manufactured by Dicon Technologies, Schoeller Textil or Faytex DRI-LEX. These composite construction may abut the foam, spacer fabric or thermal nonwoven product as an option in this moisture transfer system. Fabric composites maybe used next to an open cell foam and/or spacer fabric and an exterior shell fabric for a hiking shoe, ice skate etc.

Alternatively, the elastomeric cellular composite may be mechanically bonded to the thermal nonwoven composite or replace the open cell foam layer embedded in the thermal composites or Thinsulite, Thermolite or the like. The elastomeric composite may be welded or mechanically bonded to the nonwoven or foam composite with open cell foam or the thermal nonwoven composite to increase moisture transfer capabilities. Alternatively, the elastomeric and silver fibers may be flocked to the open cell foam or inner lining fabric. The elastomeric and foam or nonwoven combination may replace any layer or layers in this moisture transfer system. Preferably, the elastomeric composite are used in a thinner application for technical apparel, golf, running and tennis shoes and the like.

Layer 70 is a breathable membrane if used. The Phase Change Technology by OUTLAST Technology may be added to layer 70. The breathable membrane and Phase Change Technologies may be combined to increase the thermal attributes of the moisture transfer system. The Phase Change Technology by OUTLAST Technology, Frisby Technologies, Wisconsin Global Technologies, Schoeller Textil, Freudenberg or Dicon Technologies or the like can be applied to the fabrics, nonwovens, foams, elastomeric composite, thermal nonwovens or fibers blends in the liner. In the case of Frisby Technologies the foam may be COMFORTEMP or COMFORTEMP DDC. In the case of OUTLAST Technology, the Phase change microencapsulated technology may be applied to fibers, fabrics, nonwovens, breathable membranes or carried in a binding agent applied to a foam, fabric or nonwoven surface. The OUTLAST Technologies (Phase change Technology) may be applied in a coating, membrane or directly on the fabric or in the fiber In one option, Phase change Technology is added to wood pulp or cotton fibers or a blend with or without elastine fibers may replace the layers of the aperture nonwoven. This Phase Change paper or like wet-lay product may be used in the layers of foam and nonwovens an is optionally moldable. In fact, this paper product may be used with or without the Phase change Technology to enhance the moisture transfer in this liner system. The natural and synthetic paper fibers may be included with foam with or without Phase Change materials for disposable composite products for medical and industrial use. The moisture transfer breathable liner can be developed with or without the Phase Change Technology. The Phase Change Technology can be applied to any layer in this moisture transfer system. An option to Phase Change Technology is the microencapsulated thermal glass or polymer spheres applied to a foam layer, a nonwoven or fabric layer. The air sphere may add insulation to the open cell foams and the nonwovens in this invention. Suggested nonwovens and foams by Dicon Technologies, Foamex, Freudenberg, Dupont, DTI, Gore or 3M Nonwovens or the like are recommended. These glass or polymer spheres can be applied any fabric, insulated nonwoven, foam or the elastomeric composite layer. The Dicon foam may include FOSSHIELD or antimicrobial fibers. Fossheild may be included in Freudenberg, Dupont, and DTI nonwovens or the like. The preferred thermal embodiment in this application is the selected THERMALFOSS composite manufactured by Foss Manufacturing which transfers moisture.

If encapsulation technologies fabric by Nextec, Toray, ASF or the like is used in outer layer 80 as discussed herein, then it preferable to use a thermal composite, Thermolite, Foss nonwoven thermal composite (Thermalfoss) with or without foam or Thermolite or Thinsulate abutting the spacer fabric in layer 50.

In of a number of performance category the inner lining fabric material abuts a thermal composite and a spacer fabric and outer shell fabric. The thermal fibers and composites are eliminated in warmer liner applications.

Figure 4:
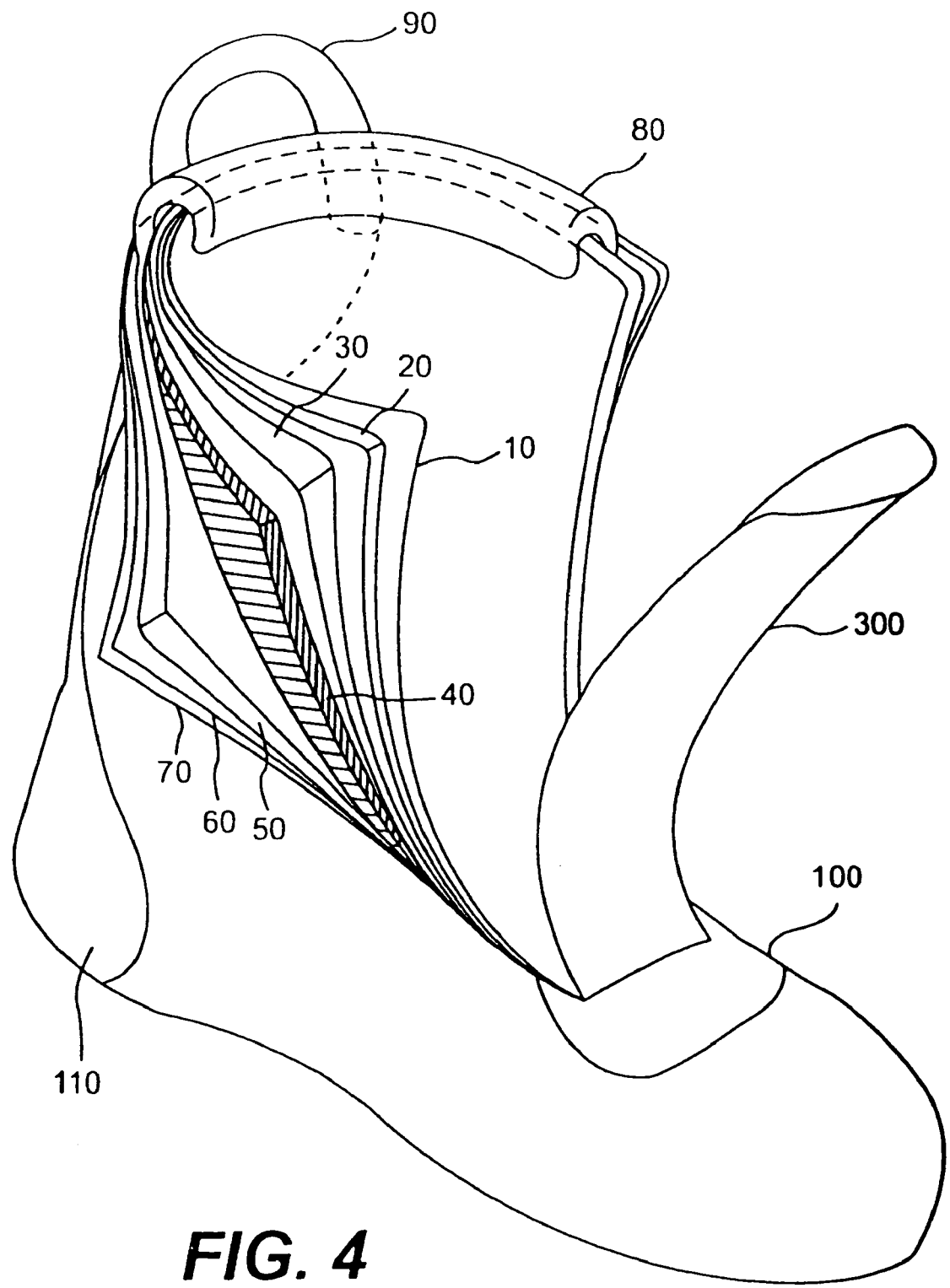
FIG. 4 illustrates the liner shown in FIG. 3 which will form a part of a snowboard or alpine liner.

The moisture vapor continues from the second foam or foam or nonwoven composite material 30 through the mesh, or spacer fabric or the third foam layer. The third foam layer may optionally incorporated the mesh and be moldable. Alternatively as discussed, layer 50 be a thermal composite or a nonwoven foam composite. The moisture transfers through absorption or wicking through layer 50 to the outer shell fabric or through layer 70, a breathable membrane. The products and performance criteria determine the selection in layer 50. The moisture vapors are then passed through waterproof/breathable membrane layer 70 if applied. The moisture vapors are absorbed into waterproof/breathable membrane passed through to an outer layer of fabric 80, as shown in FIG. 4. The waterproof/breathable membrane 70 can be selected from a variety presently available on the market. 2000/PLUS/STANDARD/1300, SECO-TEC, THINTECH, LAY-TEK, SYMPATEX WINDLER, SYMTHETIC ELASTIC, ENDURANCE, TRIAD, STORMTEX, ACCUVENT by Enterprise Coating, eVENT ACTIVE COMFORT, eVENT DRYCOMFORT, ENTRANT DERMIZAX, ECLIPSE, ENDURANCE, ENTRANT eVENT DRYTRAIL by BHA, WINDSTOPPER by Gore and WITCOFLEX SUPER DRY FILM by Baxanden Chemicals (a hydrophilic membrane) are currently being considered as well as numerous additional membranes in the marketplace. However, the membranes currently considered to be the preferred ones are called TX-1540 (application by Shawmut Mills) or membranes distributed by Harrison Technologies or Brookwood companies. TX-1540 is intended to be an ultra-thin, skin friendly, moisture barrier that allows moisture vapors to escape while preventing outside water from penetrating. The Phase Change Technology inclusive in a membrane by Outlast is an optional in this moisture transfer liner or the Frisby or Schoeller COMFORTEMP foams or Freudenberg nonwovens in combination with other membranes or with encapsulation, waterproof films or finishes fabrics or fibers. Of the various encapsulation techniques, the one practiced by Nextec is particularly advantageous. This invention suggests the use of the Phase Change Technology to enhance the thermal abilities of the liner materials. However, natural and synthetic thermal fibers and combined foam and moisture transfer nonwoven composites are the preferable embodiment in this moisture transfer system. Variations of these systems can accommodate sports apparel and protective clothing.

Also shown in FIG. 4 is an optional protective rim or cuff 90, made of a reticulated moldable foam (by Foamex, for example). A spacer fabric by Muller Textil covered by a nylon blend or neoprene covered by LYCRA. The cuff is optional in the alpine boot and snowboard boot. A pull tab 100, preferably made of nylon, is connected to the protective rim 90. In the adventure sports applications such as climbing shoes, an abrasive protective material 110 is provided adjacent to a tongue 300. Another abrasive protective material 120 is provided around the heed portion of the shoe. Abrasive protective material 120 is supplied by Schoeller, DuPont, Nam Liong or the like. This protective material is optional in all alpine, snowboard, skate and soft-shell liners and boots as well as for protective gear for hockey and the like. The outer layer of fabric 80 of the lining system has 200 to 6000 denier strength and is made waterproofed by a breathable membrane, a film, finish or coating, or encapsulation technology or by using structurally knitted, water repelling fabrics. Encapsulation technology is the preferable embodiment for waterproofing in this invention and developed by a company called Nextec, Inc. or Toray, Inc. (a Japanese company, ASF or the like). Optionally, Nextec Encapsulated Technology can be combined in a layer of fibers or fabric with the Outlast THERMOCULE fibers or nonwovens by Freudenberg or the like. A breathable membrane and encapsulated fibers or fabrics by Nextec, Toray or the like may be combined in some performance categories with or without Themocule fibers.

Frisby/Schoeller COMFORTEMP foam two and three layer composites inclusive of inner lining materials and foam with or without Phase Change Technology or a inner lining material, foam, knits or nonwovens backing maybe applied in this liner system. In one embodiment the Schoeller composite or the like abuts a waterproof breathable membranes when applied in layer 70 or a encapsulated, film or finished exterior shell fabric in layer 80. The two and three layer Schoeller composite liner is an option in this moisture transfer liner. If the outer shell fabric is encapsulated then the Phase Change Technology by OUTLAST Technology, Frisby Technologies, Schoeller, Wisconsin Global or Freudenberg, Dicon may be incorporated to the fibers, foam, nonwovens, or fabric in layers 50, 60 or 70 prior to encapsulation. The Phase Change Technology regulating molecules can be incorporated into the spaces between the encapsulated fibers and may be inserted at the time of encapsulation. The breathable membranes, coating, finishes and films if applied preserves the outer layer of fabric 80 and perform as a waterproof barrier for the rider's liners. If the encapsulation technology is applied to the outer layer of fabric 80, then the breathable laminate membranes need not be used. The Phase Change Technology is an additive and is option in this liner system. Thermal fibers and air sphere may be added to the foam or fabrics or nonwovens layers with or without the Phase Change Technology.

The outer layer 80 may be any of the following materials, either individually or in combination. These materials include nonwoven synthetic blends, kevlar and nylon, polyester blends, synthetic breathable waterproof leather and fabrics, encapsulated fabrics and nonwovens or the like. Suggested fabrics by Daewoo, Schoeller, NAM LIONG, Nextec, Brookwood, Freudenberg nonwovens, DuPont and Toray, Cordura and Supplex nylon treated by Encapsulation Technologies by Nectex or Toray, or the like. The outer shell layer 80 made of nylon, Kevlar, polyester fabrics, polymer or spacer mesh or spacer fabric. The material combinations in layer 80 may be waterproofed by encapsulation, a waterproof breathable membrane, structurally knitting the fabric to repel water or coating and or finishing the fabrics with a waterproof film or spay. Preferably, the outer layer 80 is encapsulated or treated with a waterproof breathable finish or film. The outer shell may not be waterproof in some performance categories. The outer shell preferably is a combination of one of the above-mentioned materials abutting an elastomeric composite, an open cell foam composite or thermal nonwoven or thermal nonwoven composite. This ultra thin moldable composites may be applied to running, golf and lite-hiking footwear or technical apparel or a number of performance products.

A preferable selection of Schoeller Textil blends such as Cordura, DUNAFIL TS70 and KEVLAR creates a fabric with abrasive properties of leather but breathable and flexible. Another excellent option from Schoeller Textil is of DYNAMIC EXTREME Cordura nylon or Cordura are another excellent selection in layer 80. Waterproof/breathable fabrics such as ENTRANT Gil, DERMIZAX, TUFLEX, GYMSTAR, DYNAMIC, or the like may be used in a number of performance categories. Technical products demand specific performance criteria Selected engineered fibers and foam combinations and layered constructions determine the success of the moisture transfer system and are detailed for each product and performance level. The foam, foam composite, moisture transfer nonwoven, nonwoven composite, elastomeric composites and fabrics may be treated with an ionized solution to increase the moisture transfer capabilities. A foam composite is defined in this invention is an open cell foam including a moisture transfer nonwoven layer or nonwoven fibers or an open cell foam backed by a moisture transfer nonwoven or alternating layers of foam and moisture transfer nonwoven. A nonwoven thermal composite is a needle punch nonwoven such as Thermolite, Thinsulite or a SSOF THERM or the like or a blend of synthetic or synthetic and natural fibers mechanically bonded to a open cell foam.

A moisture transfer nonwoven composite is a spun bonded or wet-lay blend of natural, synthetic fibers or a blend of these nonwovens fibers with or without the open cell foam and silver fibers added. The nonwoven synthetic fibers are optionally lobed, shaped or hollow fibers. The moisture transfer nonwoven composite may be substituted in any layer of foam, thermal needle punched nonwoven or thermal nonwoven composite in this liner composite system. In one embodiment the moisture transfer nonwoven or mechanical bonding to an open cell foam.

A foam composite is open cell foam including, a nonwoven layer polymer mesh or all three. The nonwoven fibers may be synthetic or natural fiber included in one process during the formation of the foam. The foam composites may be substituted for the elastomeric composite or any foam layer or nonwoven layer. Alternatively, the foam composite may abut a moisture transfer thermal composite. The foam composite is not to be confused with an cellular elastomeric composite. The elastomeric composite fuses the fibers and liquid polymer foam together with intense water pressure. The foam composite adds the fibers or nonwoven layer to a liquid reactive polymer foam or frothed foam. In some cases the foam composite is heat set.

The inner lining materials or fabrics are an important part of this moisture transfer system. The following fabrics and nonwoven materials are preferably selected for their moisture transfer abilities may be used for the lining of the inner liner insert or lining outer moldable shell composite, however any fabric or material listed may be applied in this composite construction.

The polyester looped terry blend by Coville, Kronfli or the like is an excellent wicking fabric and can remove moisture rapidly when treated with a wetting agent or combined with chemically or naturally ionized fibers. Suggested for hiking applications.

The anti-fungal, anti-microbial, DRI-LEX nylon and nylon blended fabrics, like the polypropylene, is sanded and soft. The material is extremely comfortable and cool to the tough. Suggested for hiking and climbing applications.

The polyester FIELDSENSOR fabric works well with those individuals who prefer maximum performance. The liner absorbs moisture immediately. DRILINE by Milliken offers a similar response and contains LYCRA for products requiring stretch.

A polyester microfiber fabric, COMFORTEL and FORTEL SPUNNAIRE by Wellman or DYETECH by Dyerburg, CONCEPT III or the like, is smooth to touch and wickable. A wetting agent may be added to assist in moisture transfer.

Coville fabrics a fleeced or terry polyester.

Freudenberg Nonwovens Materials.

Calamari cerami polyester fleece is an excellent option for winter products.

Conductrol acrylic based conductive fibers may be combined in an number of performance categories with natural fibers.

A structural knitted or woven natural blend of wool, cotton, corn, hemp or kapok may be used as an inner lining fabric option In some performance categories these natural fibers may be in combination with synthetic fibers and have LYCRA or elastic fibers combined for stretch or a felted wool and Ssoftherm blend with silver fibers may be utilized as the inner lining material. Alternatively, any of these inner lining materials may be backed with a flocked fiber blend of synthetic fibers such as polyester, acrylic, acetate, tencel or natural fiber such as cotton, wood pulp, lyocell, rayon or the like or the inner lining material may be double-sided with one fiber on the face and another fiber or fiber blend on the back. Chemical ionized solutions, wetting solutions and surfactants may be added to the foams, nonwovens, thermal nonwovens, fabrics and spacer fabrics in this moisture transfer system.

Figure 18:
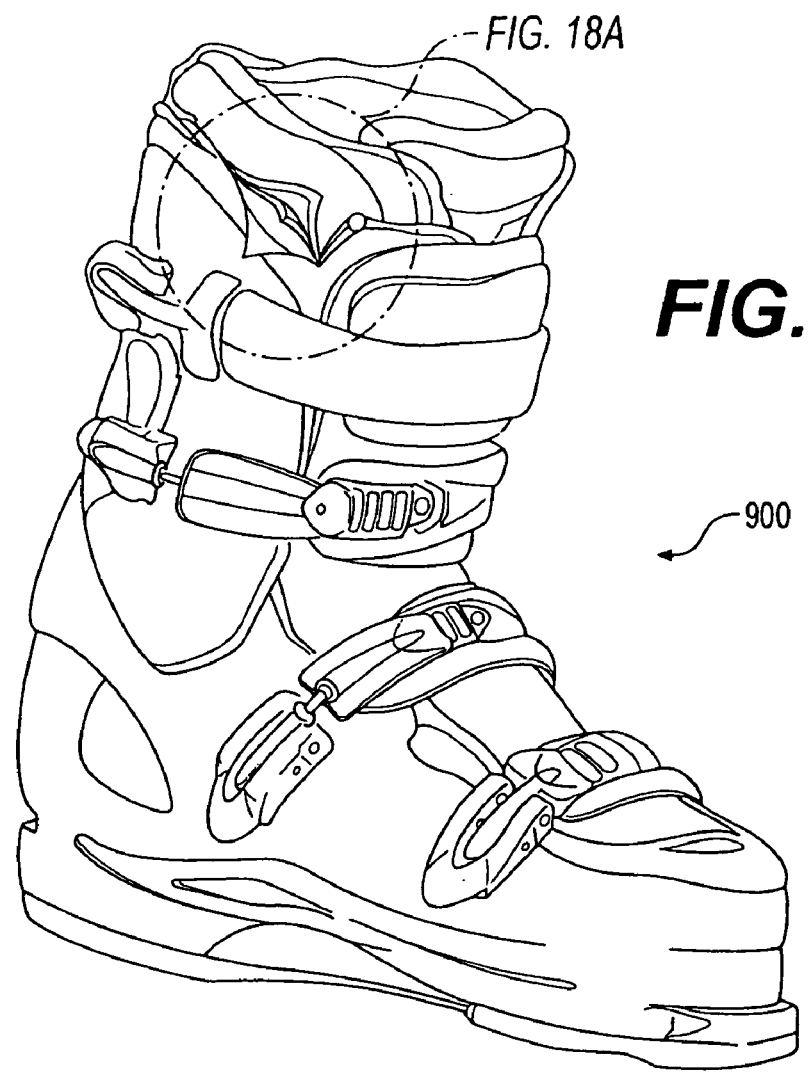
FIG. 18 illustrates a soft-shell alpine boot exterior shell composite.
Figure 18A:
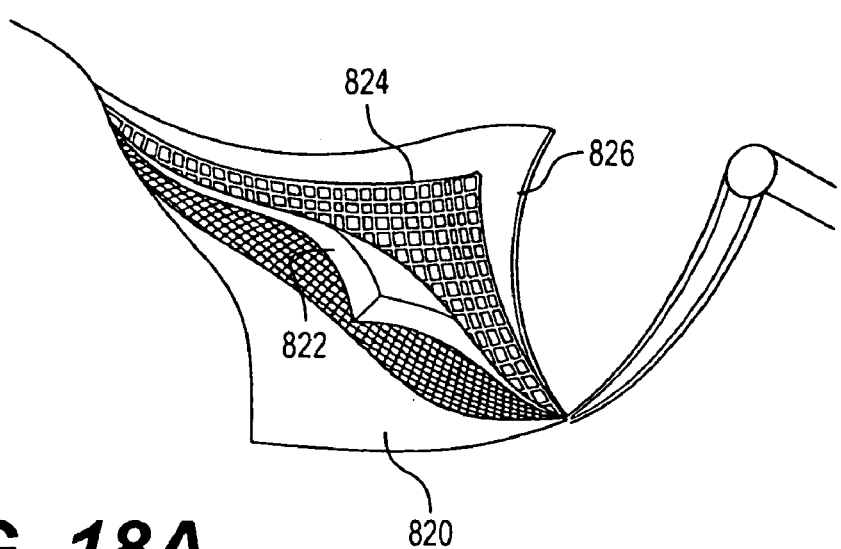
Figure 19:
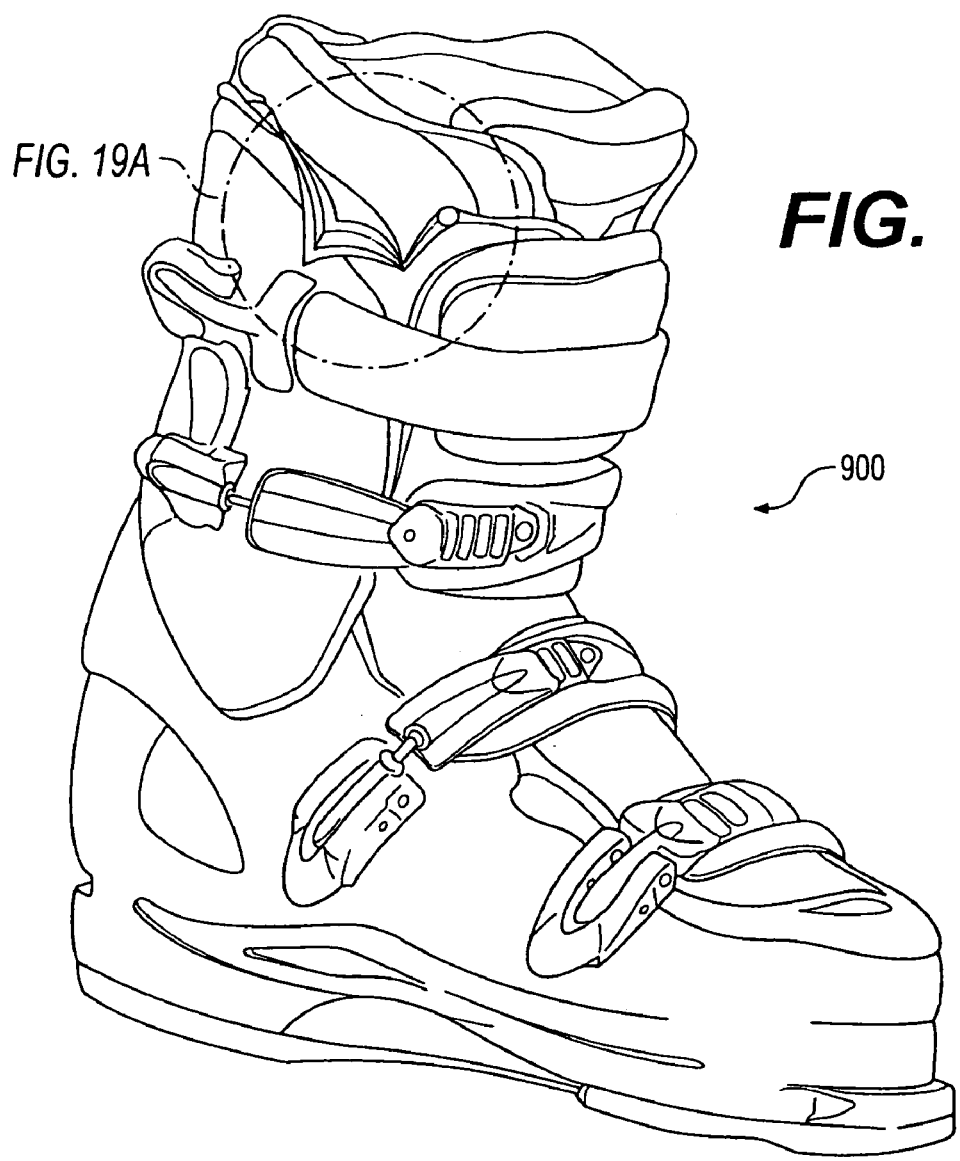
FIG. 19 illustrates a soft-shell alpine boot exterior shell composite.
Figure 19A:
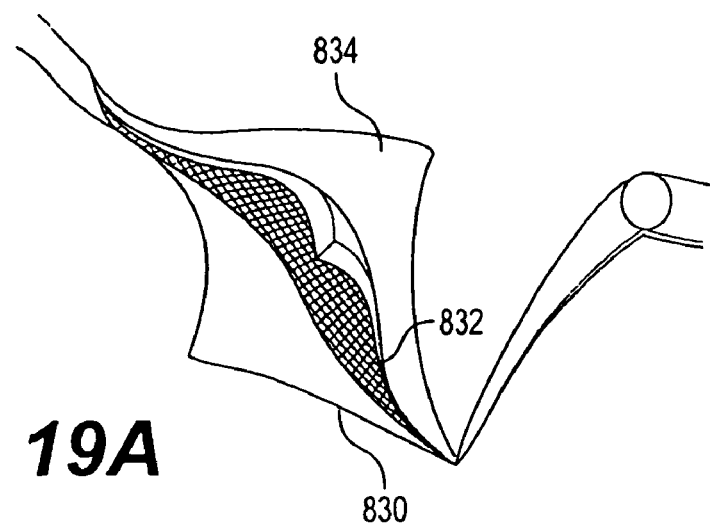
Figure 20:
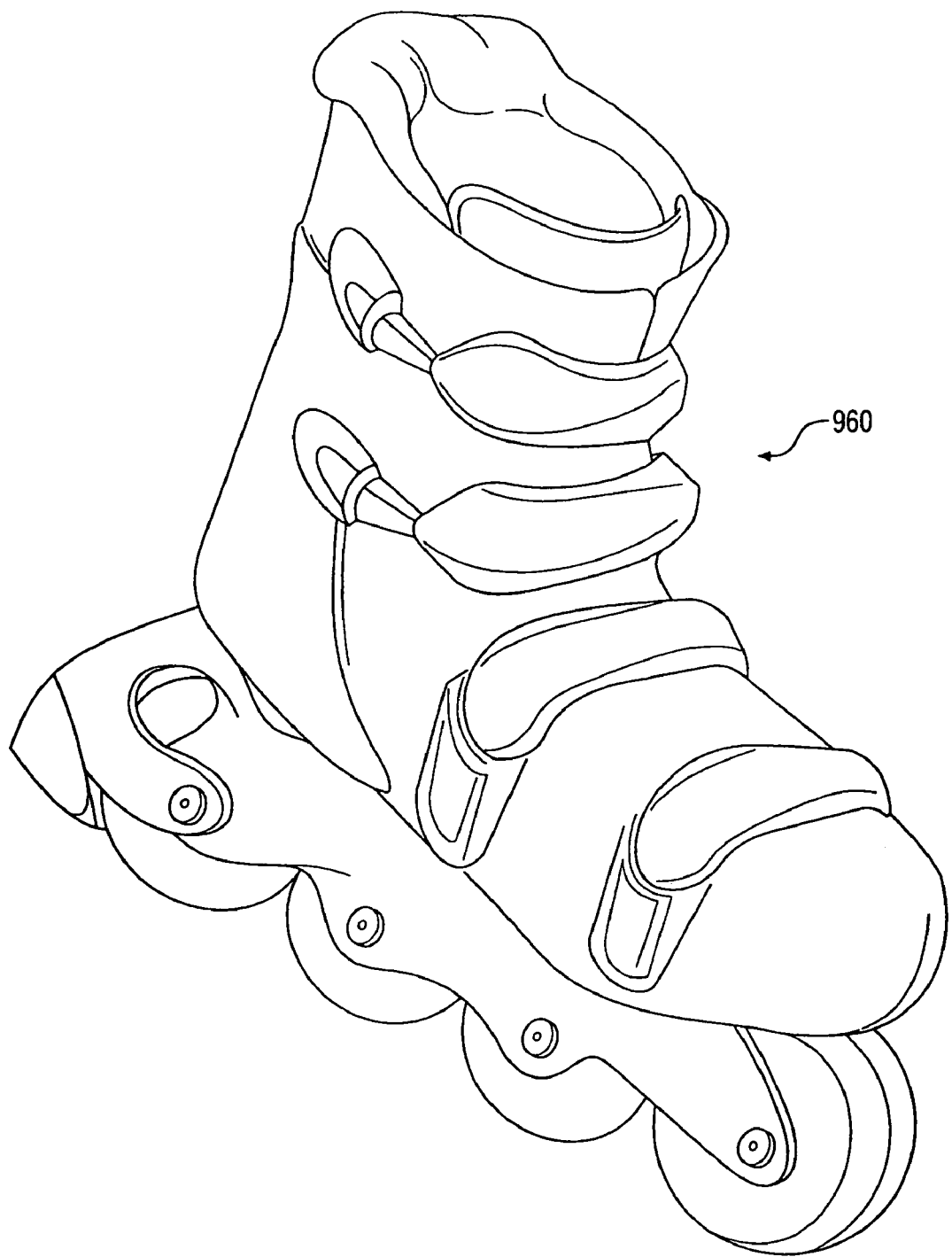
FIG. 20 is a polymer shell for a hockey skate including a moisture transfer liner.

Exterior shell boot composites for in-line, hockey skates, alpine, climbing and hike boots and shoes or the like are discussed in FIGS. 18, 19, 20. These moldable, breathable, moisture transfer exterior shell composites may be to be combined with a polymer skeleton framework in some options. The recently developed soft-boot for by Rossignol skis, Tecnica, Salomon are examples of a polymer skeleton and a nonwoven or fabric composite construction. This inventions realizes the need for added moisture transfer exterior shell boot composite for the snowboard boot, ice and hockey skate, soft alpine boot and the like. Presently, the soft-shell alpine boot for down hill skiing is composed of a polymer skeptical framework combined with a non-breathable a synthetic or leather composite. These existing products do not transfer moisture. In fact the boots are often hot and wet and eventual cold. The polymer shell is adhered to the existing synthetic or leather composite by adhesive, welding, fused, molding or the like. The existing soft-shell liners and boot composites are not breathable and discourage the moisture from evaporating. The invention presents moisture transfer liner insert that successfully moves the moisture vapor through the composite layers to the surface material of the insert liner.

The insert liner improves the dry climate of the boot substantially. However the existing soft shell encompassing the insert liner is not breathable and does not transfer moisture. The soft-shell boot construction can be develop to transfer moisture and increase the performance of the existing boots on the market with the following constructions.

These composites may be used for protective gear, skates and hiking and work boot application.

The soft-shell exterior composite layers in FIGS. 18,19, and optionally in 21 aids in the transfer of moisture off the surface of the insert liner. The moisture travels through the layers of the inner liner insert and successfully moves through the outer shell composite layers. The engineered fibers and foam layers of the soft-shell boot composite absorb and continue the transfer of moisture out of the boot. The soft-shell boot composite constructions are combined with the polymer skeleton and material. The soft-shell boot constructed with these moisture transfer and optionally waterproof composites and including the insert liner realizes a total moisture transfer and breathable product with the added benefits of thermal regulation and anti-microbial properties.

This invention develops the following moisture transfer soft-shell composite to combine with skeletal polymer inclusive in the Rossignol Skis, Salomon, Tecnica etc. soft-shell boot or the like.

Figure 21:
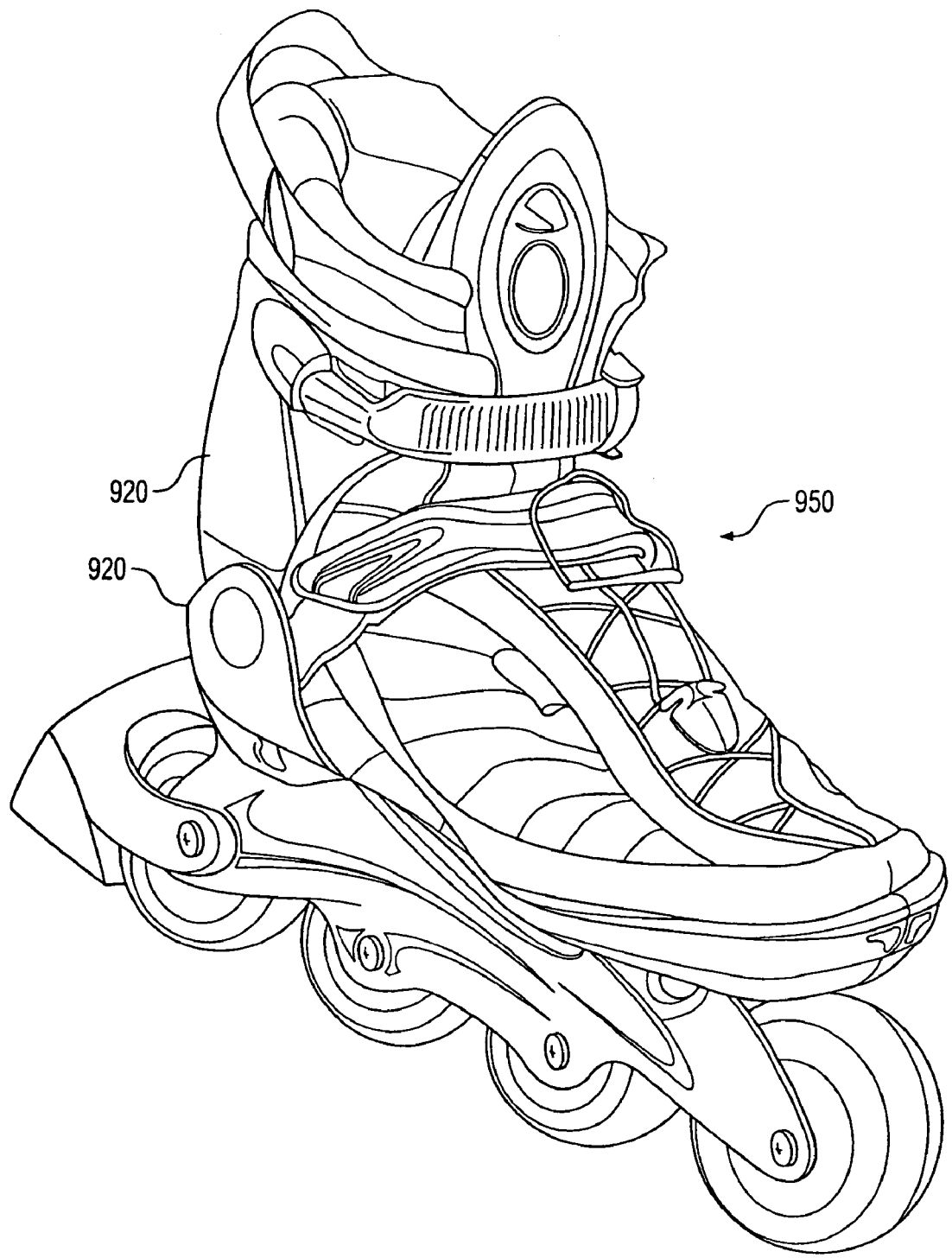
FIG. 21 illustrates soft-shell in-line skate or the like exterior shell composite.

The first layer in FIG. 18, 19, or 21 is a blend of natural fibers such as cotton, kapok, hemp, wool woodpulp, lyocell or the like or a blend of synthetic fibers or natural and synthetic fibers. The nonwoven fibers maybe treated with a wicking solution or with Transfer Dry Fiber Technology or Wisconsin Technology and maybe aperture. Alternatively, a knitted or woven polyester blend may be substituted for the nonwoven inner facing material. This layer is 820 and 830 in FIGS. 18 and 19.

Layer 822 and 832 is a thin variation of the moisture transfer needle punch nonwoven composite described in the previous embodiment or THERMALFOSS with or without a polyurethane coating. The exterior shell fabric is waterproof as discussed above. In one embodiment the THERMALFOSS is needled or laminated to a aperture nonwoven or elastomeric composite abutting a foam and the inner lining material on one side and the exterior shell fabric. The nonwoven may be optionally coated with a polyurethane breathable polymer to increase stiffness and adhesively bond the exterior shell material. Layer 822 and 832 may be replaced with or a elastomeric composite, thermal nonwoven or nonwoven composite A polymer mesh by Naltex, Conwad or the like may be attacked to layer 822 or 823 in some performance categories.

In another embodiment a structural polymer mesh is combined with the open cell foam in one process and bonded to or placed between the exterior shell material. The foam may contain synthetic or natural fibers or both. The embodiment may also combine the nonwoven in the foam as the inner lining face material of the exterior shell composite. The foam composite may be replaced by a spacer material in some performance categories.

In another preferable embodiment the exterior shell waterproofed composite is developed with an inner lining fabric or nonwoven abutting a moisture transfer nonwoven composite or moisture transfer thermal nonwoven composite attacked to an frothed foam such as those developed at Textile Chemical and Rubber, Dicon or the like and the exterior fabric.

The frothed open cell foam may alternative be supplied by Hydrophillix or the like and may be hydrophilic. The exterior shell fabric is treated with a coating, encapsulation or a film and is breathable optionally, the inner lining fabric can be laminated to the foam and a nonwoven to the exterior waterproof shell fabric. This composite construction is preferable in the thinner applications such as the bouldering shoes and hockey, ice skate and bloudering, climbing shoes.

A foam or elastomeric composite or nonwoven blend may be laminated or welded to the inner lining material and outer shell fabric in one process accommodates another optional. The ultra thin moisture transfer composite may additionally included a structural mesh or spacer material to increase the rigidity and performance. FIG. 18 displays the mesh as layer 824. The polymer mesh if needed may be included or inserted in any layer in the exterior shell composite or inner liner insert. In one embodiment the elastomeric is the inner lining material creating a two layer moisture transfer composite system.

The exterior shell fabric may be a waterproof breathable leather, nonwoven, knit or woven blend. The preferable construction is an antibacterial nonwoven synthetic or synthetic and natural fibers needled together with open cell foam and silvers fibers attached to the exterior shell fabric by a frothed foam. The thermal fibers may be manufactured by DuPont, Gore, 3M, Freudenberg or Foss Manufacturing or the like. The Foss nonwoven blend may be SSOFTHERM, with or with out foam. A nonwoven and foam composite.

It is preferable when utilized a waterproof breathable coating to select a permeable hydrophobic coating with tiny pores built for moisture vapor transfer performance. An open cell foam or frothed foam may replace the needle punch thermal composite in layer 110 nonwoven composite or thermal nonwoven composite. The foam may have a structural mesh incorporated during development or the structural mesh maybe laminated or welded to the foam or to layer 120. A nonwoven may optionally be inserted or laminated to the foam inner lining surface. Layer 120 is the exterior shell material comprised of nylon, polyester or KEVLAR blend, synthetic leather, leather or nonwoven. A breathable synthetic material or leather is suggested such as that manufactured by Schoeller's or NAM LIONG.

A optional composite construction would incorporate a elastomeric composite by FoxRun in layer 110 welded or fused to a nonwoven abutting a foam including a structural mesh or an elastomeric welded to a knitted fabric in layer 100 and the synthetic shell fabric of the soft boot Layer 120. A similar composite construction may be used in layers 820 to 826. The elastomeric composite may include a structural polymer mesh to increase the liner integrity.

The insert footbed layer 200 of the moisture transfer liner is removable and constructed to move moisture downward and out away from the rider's foot. The inner lining material abuts an open cell foam that is welded or laminated to an top sheet abutting a breathable moldable spacer product preferably by Muller Textil, Foxrun or the like. The bottom portion of the foam is preferably provided with a moisture transfer nonwoven top sheet as described earlier. The insert footbed can be used for all applications in this invention and may contain a structural polymer mesh or spacer material in some applications.

The moisture transfer nonwoven top sheet may be eliminated in some options and may be a knitted or woven construction. Alternatively, the foam and nonwoven combination can be replaced by the elastomeric composite, the Foss thermal composite (THERMALFOSS), a nonwoven blend by DuPont, Freudenberg, 3M or Foss Manufacturing or the moldable spacer fabric in the footbed. The hiking and climbing shoes or work boots may require a thinner option similar to the hockey and ice skate, bouldering shoe and cross country boots comprised of a inner lining material or an elastomeric composite and a moldable spacer fabric. The elastomeric composite may be welded or mechanically bonded to the spacer fabric. In fact the elastomeric composite can be in any combination in this footbed or liner system.

The spacer fabric composite adds support and transfers moisture downward. In a foot wear product such as a lite hiking shoe the top three layer of inner lining fabric, elastomeric and a nonwoven would abut a molded polymer, foam or cork insert base.

The foot bed for the alpine or skate may also be constructed with a moisture transfer inner lining fabric, a Foss nonwoven blend with or without foam attacked to a molded base made of polymer, foam or a spacer fabric. Hydrophilic frothed foam by Hydrophillix, Inc. maybe be applied between the footbed shell fabric, the Foss nonwoven or the hydrophilic frothed foam by Hydrophillix may be applied to a nonwoven layer abutting the top sheet fabric and attack to the molded insert footbed polymer composite. The heel pocked foam or the spacer material protects the back of the heel. The foam and polymer mesh composite may be used to protect the heel, toe or side walls of the footwear protect. This cushion protector allows circulation in the heel. Toray's polyester FIELDSENSOR fabric, Deercreek and Coville polyester and polypropylene fibers and blends micro-fleeced or EVOLON by Freudenberg are some of the preferable lining material for the foot bed or selected disclosed fabrics previously mentioned. A slow recover foam may be used in performance footwear, alpine boot or skate categories.

The alpine tongue 300 is one of the inner liner materials mentioned above, especially the FIELDSENSOR polyester, fleeced polypropylene, LYCRA blend with INNOVA fiber, the polyester microfiber, the polyester looped terry or the fabrics by Malden Mills, looped polyterry, polyester or polypropylene fleeced blends. This inner liner fabric 310 is preferably laminated to a structural support foam composite backed by a moisture transfer nonwoven 320. The moisture transfer nonwoven abuts a spacer fabric or moldable foam 330 with or with out a polymer mesh and fibers and the exterior shell selected fabric. Preferably, the open cell foam is 1/32" or 1/4". Alternatively, layer 320 may be an elastomeric composite or Foss thermal nonwoven composite welded, fused or laminated to the moldable spacer material layer 330 and exterior shell fabric in layer 340. Layer 330 may be a polymer mesh inclusive in a moldable open cell foam. The spacer fabric and polymer mesh in the foam may be omitted in some products or performance categories. The exterior shell fabric is selected from one of the outer fabrics mentioned and is partially covered by a molded perforated polymer 350 for protection and support in the alpine boot. The tongue construction of the hiking and climbing shoes preferably utilizes the Foss and/or DuPont fibers or thermal fibers composite blends, moldable foam composite or the elastomeric composite with an inner lining material and exterior selected fabric and the spacer products may be eliminated. The hydrophilic open cell perforated foam 330 can take the shape of the foot bones and protect the upper foot from damage. The foam composite 320 can also be shaped to accommodate the foot and protect the ankle bones. Optionally, a moldable spacer fabric by Muller, or the like, may also be used as portion 330. Alternatively, an open cell foam, preferably reticulated open cell foam, may replace the spacer product and be treated with a hydrophilic foam coating by Hydrophollix, Inc. and molded to accommodate the ankle footbed, toe box or tongue. The open cell foam may also be treated with a wicking solution to increase its hydrophilic performance nature. The abutting nonwoven is applied may be treated with the hydrophilic coating or a wicking solution in a numerous areas in this moisture transfer system. The treatment by Hydrophollix can be applied to any later in this embodiment.

A moisture transfer material 340 lies over the breathable, hydrophilic open cell foam with or with out the hydrophilic treatment or perforated foam 330. This moisture transfer material 340 is preferably. In one embodiment, a moisture transfer spacer mesh product is combined with the exterior shell fabric 340 and wraps around the outer edge of the tongue to allow moisture vapors traveling from the upper foot area to escape through moisture transfer material 340 to the outer surface of the tongue. Alternatively, the moisture transfer material may be a foam including an moisture transfer nonwoven covered by a exterior shell moisture transfer fabric or an elastomeric composite welded to an exterior shell fabric. Material 340 also aids in providing a softer edged tongue and can be a nylon and polyester blend binding of mesh material treated with a generic TEFLON for waterproofing.

Figure 6:
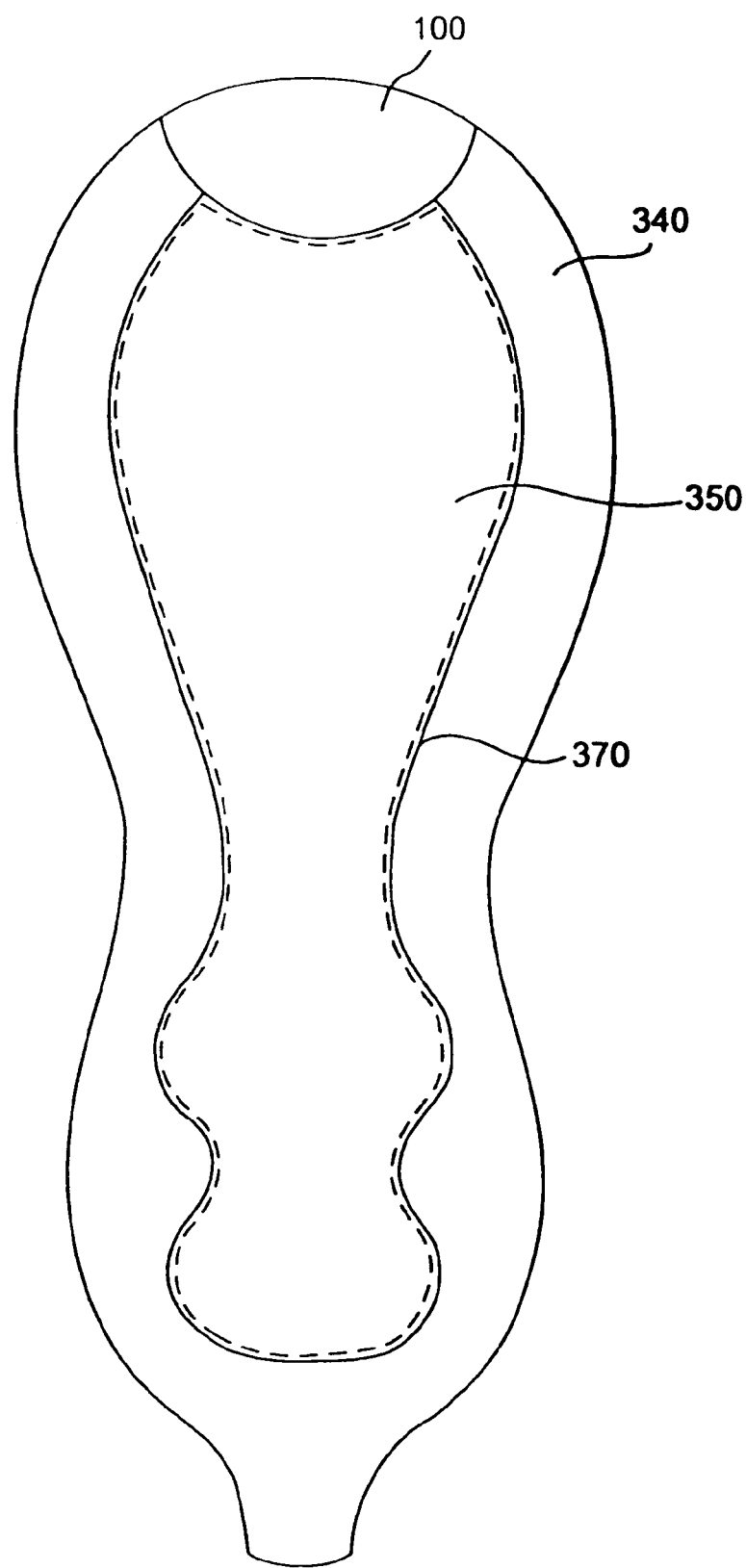
FIGS. 6 and 7 illustrate a tongue portion of a snowboard or alpine boot constructed according to the first embodiment of the present invention.
Figure 7:
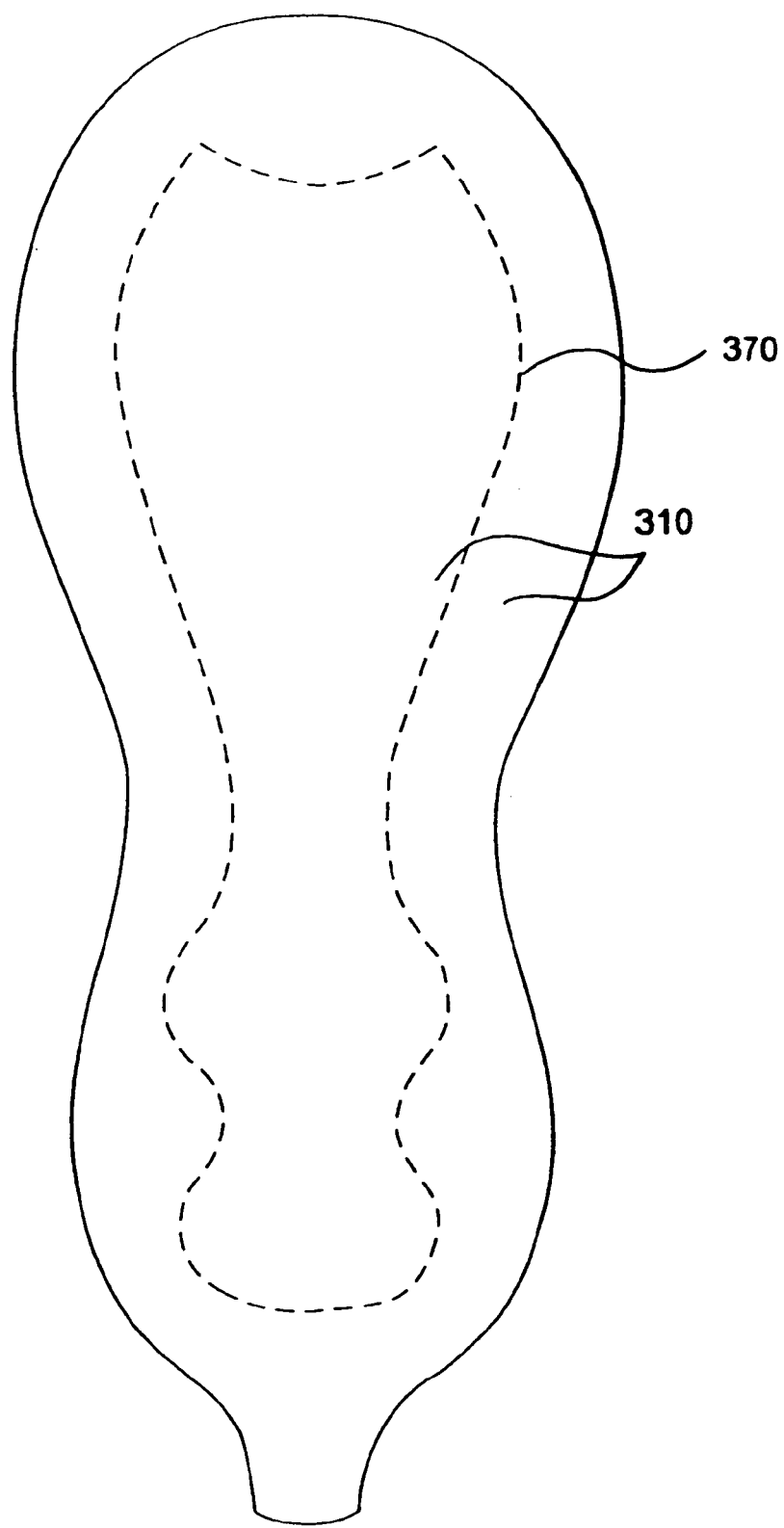
Figure 8:
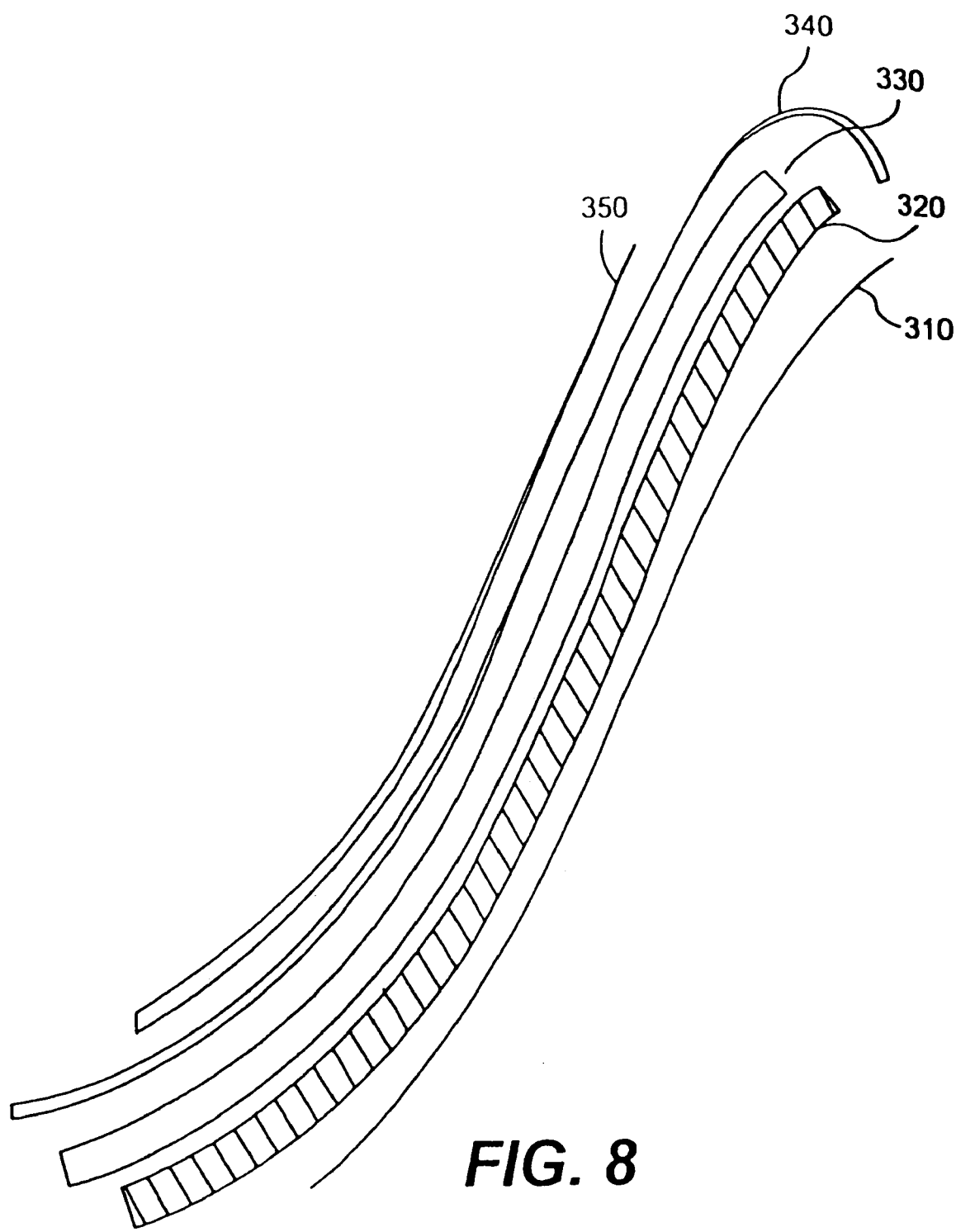
FIG. 8 illustrates a more detailed view of the liner portion used for the tongue of FIGS. 6 and 7.

Finally, as shown in FIG. 6, outer layer 350, which can be a breathable synthetic leather (by Daewoo Corp. Nam Liong or Nectex in NYC for example) or a material manufactured by Schoeller identified as Schoeller DYNAMIC (66502) or the like.

NAM LIONG fabrics in the ARMORTEX series are recommended for all exterior shell fabric options.

Figure 9:
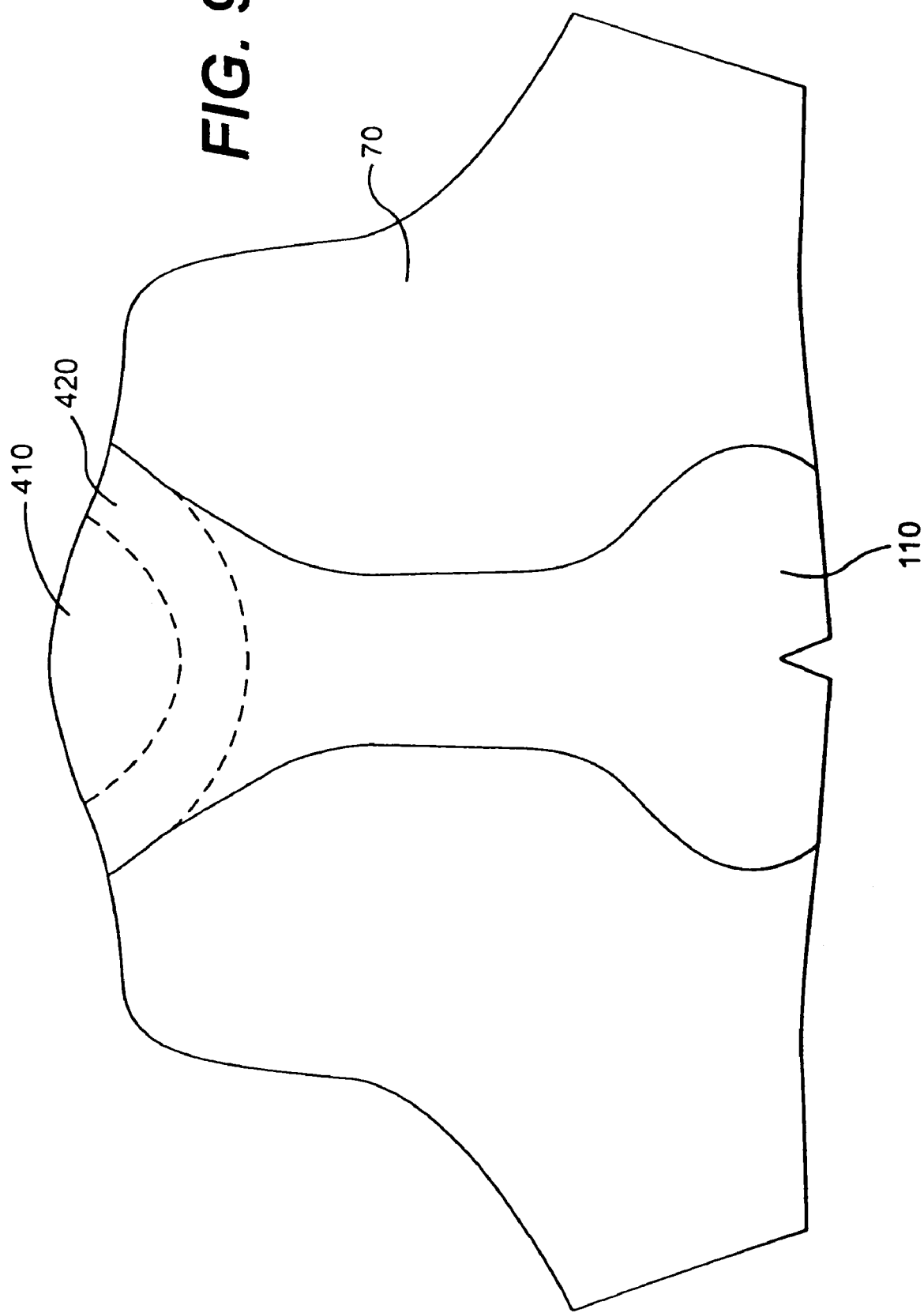
FIG. 9 illustrates a portion of the liner used in the upper cuff area.
Figure 10:
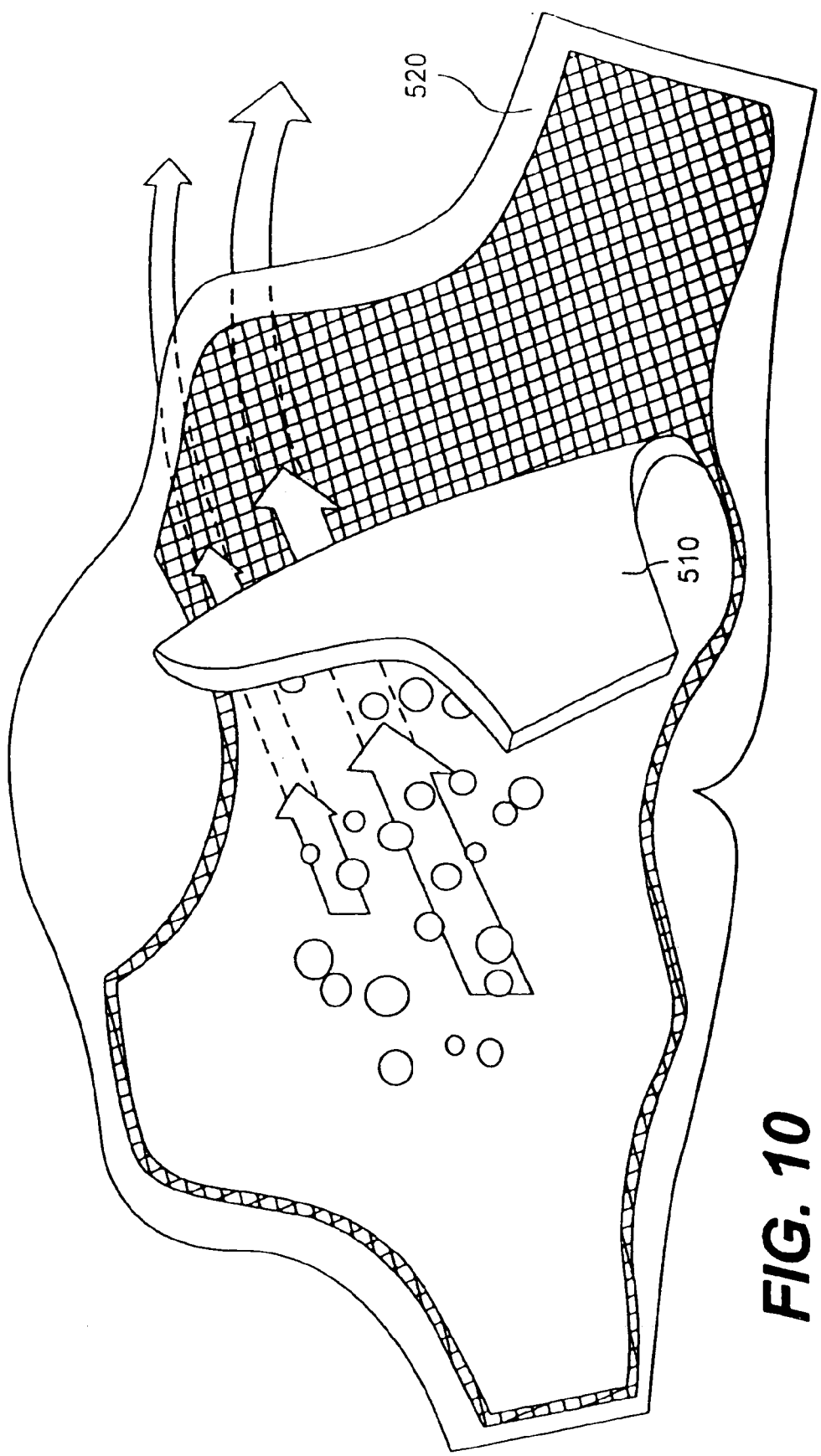
FIG. 10 illustrates the travel of moisture through a reticulated, open cell foam, spacer fabric then a flexible mesh and into and through a breathable membrane according to the first embodiment of the present invention.

The liners are preferably provided with a pull tab 100 as illustrated in FIGS. 4, 9, and 10 on the back of cuff 90 constructed of a slow recovery foam (by Rogers, or the like) moldable spacer fabric or neoprene covered by LYCRA. Optionally, cuff 90 can be omitted altogether. FIG. 9 shows an opened up version of the liner looking from the back of the moisture transfer alpine liner or hiking boot. Located just beneath the LYCRA covered neoprene cuff or spacer fabric covered with a breathable nonwoven or synthetic leather 90 is an abrasive grip fabric material 410, such as manufactured by Schoeller, Inc., NAM LIONG or the like and referred to by the number 6500. Below material 410 is a reflective grip composite material an option in the hiking boot or climbing shoe application is a highly abrasive fabric 110 as shown in FIG. 4. Fabric 110 is preferable a KEVLAR, nylon Cordura, or the like. Finally, outer shell fabric 80 is the same as that shown in FIG. 4, and can be any of the fabrics listed previously in connection with outer shell fabric 80. The nylon pull tab 100 allows the rider easy entry.

Figure 11:
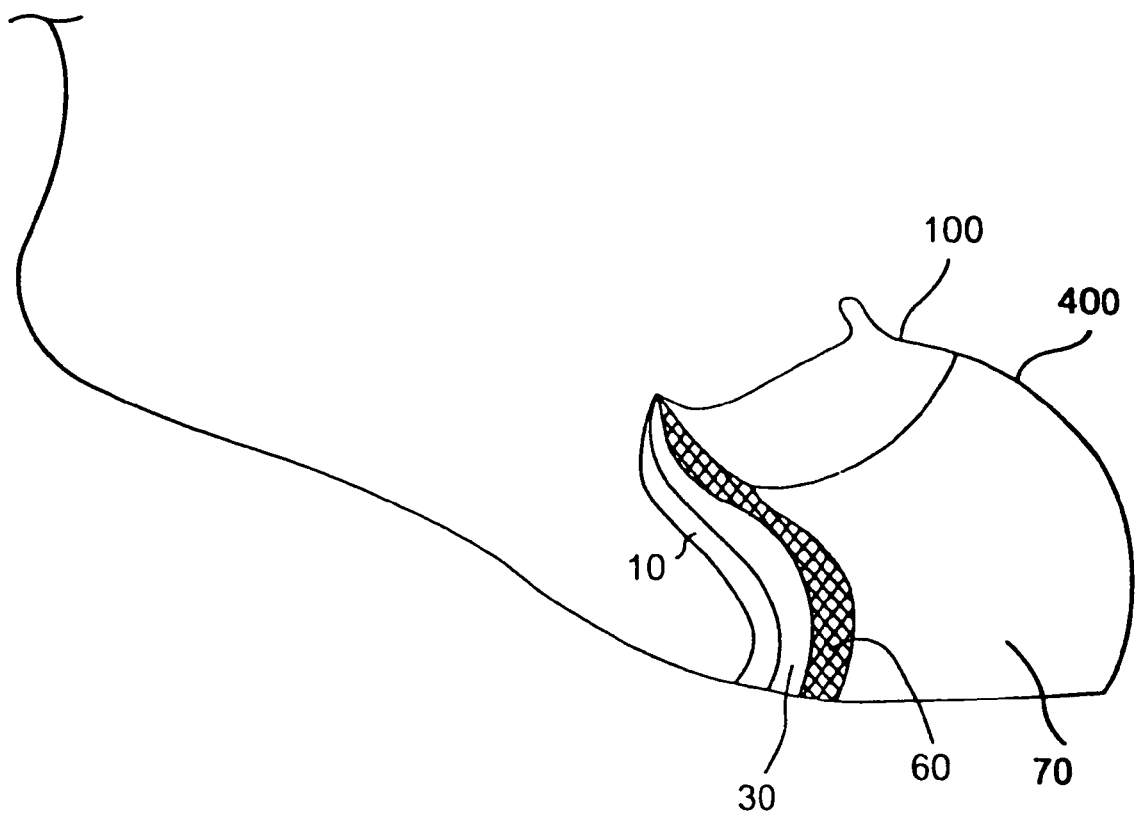
FIG. 11 illustrates the toe portion of a snowboard or alpine liner according to a preferred embodiment of the present invention.

FIG. 10 shows the other side of the liner of FIG. 9. In FIG. 10, 510 can be a ¼ inch moldable foam which has been punctured or a breathable moldable spacer fabric or the like. 520 represents the combination of the moldable polymer flexible mesh and foam or the moldable polymer structural mesh included in the foam developed process (in case the moldable foam is not used as depicted), the outer shell fabric. As in all of the figures, the arrows depict the flow of moisture. FIG. 11 illustrates the toe portion 400 of the liner. Preferably, the toe portion 400 is constructed with an inner liner fabric 10, followed by a foam composite or Foss thermal composite material 30, followed by a breathable membrane if used 60 and finally followed by the outer fabric 70. The exterior shell fabric as mentioned may be waterproofed by encapsulated, a coating or a finish or film. The foam material 30 can either be a single foam, two foams, a foam composite or a moisture transfer nonwoven composite, a Thermolite, a Thinsulite or the like and foam combination, Foss thermal composite with SSOFTHERM and foam or any of these in combination. Abrasive grip fabric is also shown.

A breathable membrane, coated fabric or an encapsulated fabric is an option in the liner, hiking boot or climbing shoe.

The 6500 high abrasive fabrics manufactured by Schoeller, Inc., NAM LIONG or the like are optionally located on the back of the cuff and the top of the toe box and heel. The KEVLAR and Cordura, STARLITE, Cordura fabrics and selected high abrasion moisture transfer nonwoven provide comfort and durability to the liners and are extremely strong and resistant to abrasion and allow for breathability and performance.

Figure 12:
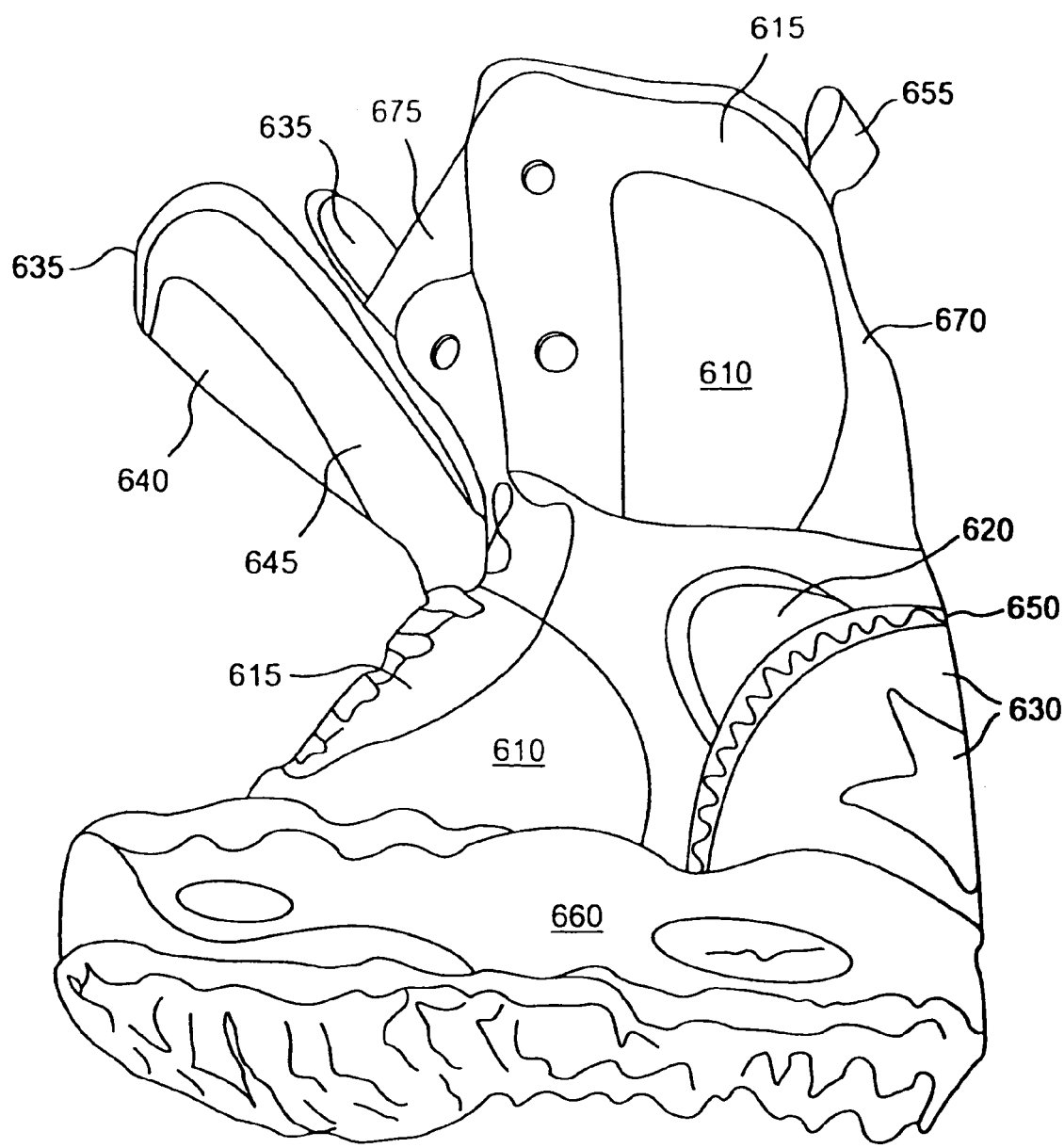
FIG. 12 illustrates an overall drawing of a snowboard, soft alpine, alpine or hiking boot insert liner which will incorporate the liner of the present invention.

FIG. 12 illustrates a snowboard or alpine insert boot liner incorporating the lining system discussed above. The snowboard boot may have a removable or non-removable liner as discussed above for the alpine boot. The following elements of the snowboard boot are shown: numeral 610 represents a waterproof breathable synthetic leather or a leather by OutDry (Nextec), a KEVLAR fabric (made by Schoeller, or a similar material), Schoeller, DuPont & Toray or the like, Cordura, DYNAMIC EXTREME, KEPROTEC, or DERMIZAX by Toray; numeral 615 represents materials similar to that of numeral 610, but can have different colors for aesthetic purposes; numeral 630 represents a KEVLAR or a material made by Schoeller, NAM LIONG, a synthetic material leather or the like, with the heel portion being synthetic rubber, EVA, or the like, manufactured by Daewoo; numeral 635 represents an inner moisture transfer material covering a breathable molded breathable foam or breathable a spacer product numeral 640 represents a KEVLAR or Cordura material; numeral 650 represents some decorative piping made of synthetic leather, stitching, polymer or the like; numeral 655 represents a pull tab made of nylon or synthetic leather; numeral 660 represents the base of the boot which can be made of a synthetic polyurethane; numeral 670 represents a reflective KEVLAR back; and finally, numeral 675 represents an optional sock that can be inserted into the boot with the permanent liner or removable insert liner if desired.

The sock 675 is made up of three or four layers and similar to the thin race boot option. The first layer can be any of the inner liner materials discussed above. The second layer is a layer of elastomeric composite, foam composite or nonwoven composite, thermal nonwoven composite, Themolite, Thinsulite, Gore nonwoven with or without foam or silver fibers. The third layer is a material that absorbs and transfers moisture such as a ionized nonwoven blend, polyester blend manufactured by Deercreek fabrics, Menra Mills, NAM LIONG fabric treated with a wicking solution or the like. This layer is optional. The preferable outer shell insert sock construction may be a three layer composite constructed of an inner lining material, a nonwoven composite with foam or without foam and silver fibers and an outer shell polyester mesh waterproof with a encapsulated, film or a finish. The inner lining fabric and outer shell layer material may be a nonwoven, knitted mesh or a woven construction. Encapsulation technology can also be applied to the third layer by Nectex. Sock 675 can be used for additional warmth and is removable, unlike the shoe liner and can be insert into the snowboard, alpine liner or the like, for extra warmth. The insert sock liner is breathable and preferable used in a boot where the liner is not removable or there is no liner available. The three layers can be attached to one another by lamination, although mechanical bonding, or stitching, or ultrasonically bonded, can also be used. This insert sock liner is recommended for the all-weather boot by L.L. Bean or the like.

The alpine and snowboard race boot requires a thin moldable liner option. The insert liner for the alpine race boot preferably is constructed in following three options; Inner lining material abutting an open cell foam backed with a moisture transfer nonwoven top sheet. The three layer composite is laminated to the Foss thermal composite and a spacer fabric material The exterior shell fabric is laminated to the a spacer fabric material.

In the second option the inner lining material is laminated to the Foss thermal composite and abuts the breathable moldable spacer fabric and exterior shell material.

In the third option the inner lining material is welded to elastomeric composite, the moldable breathable spacer fabric and exterior shell material.

Optionally, the exterior shell fabric may be a three layer composite constructed of foam, moisture transfer nonwoven and the exterior shell fabric. The three layer exterior composite may be attacked to the breathable spacer fabric and molded. In fact, any of the combinations may be molded and welded in this inventions.

The microfiber and chemical ionized technology disclosed above is rapidly developing and changing and has greatly increased the potential for improved performance of such products alpine boot, provided that they are properly utilized as in the present invention. These new technical fibers, materials, foams and moisture transfer composite combinations are part of rapidly developing technical textiles technology industry. The present invention employs a combination of fabric, foam, moisture transfer nonwovens, moldable spacer materials, breathable membranes, coating, finishes, films, structurally woven or knitted waterproof fabrics, ionized fabrics, encapsulated outer fabrics in such combinations that increase the performance of the products in which they are used as well as increase breathability. The breathable membranes, coating and finishes are optional in alpine, hiking and climbing shoes. The removable sock liner may be insert into rubber boots and all weather boots or alpine products. The discussion above has focused upon snowboard boots, alpine boots, hiking and climbing shoe liners similar applications can be made with running shoes, helmets, protective gear or cross country boots, or in-line skates, gloves, accessories, sleeping bags, back packs and apparel with slight modifications.

The snowboard boot liner, the various layers can be combined by lamination, mechanical bonding, stitch bonding, ultrasonic bonding or a combination of these two. The second and third layers would include a foam that contacts the first layer and is a germicidal, reticulated foam or a hydrophilic, open-cell foam, such as DuPont and VPF manufactured by Foamex, DRI-Z manufactured by Dicon with or without glycerin, COMFORTEMP by Frisby and Schoeller or the like. Alternatively, these layers can be a Foss thermal composite. An elastomeric cellular composite inclusive of moisture transfer nonwoven fibers or a open cell foam backed by a moisture transfer nonwoven apertured top sheet composed of wood pulp, polyester, rayon, lyocel, cotton, or polypropylene, in a single process. A foam composite may be used in combination with a thermal nonwoven.

The fourth layer is a hydrophilic, open cell preferably, (DuPont or VPF), a slow recovery foam, or Dicon Technologies foam, or polymer flex-guard mesh or a polymer flex-guard mesh inclusive in a open cell foam or a polyester breathable spacer material (by Muller) or the like for support. In this case, the open cell foam, DuPont is laminated to a moisture transfer nonwoven top sheet composed of wood pulp, cotton, polyester, lyocel, blend which abuts a waterproof/breathable membrane (fifth layer) if used. If the flex-guard polymer mesh is used it is include in the foam in one process or the flex guard is followed by another layer of open cell (DuPont) with a moisture transfer nonwoven top sheet inclusive in the foam or abutting the waterproof/breathable membrane or an encapsulated or waterproof breathable coated or filmed exterior shell fabric. If the spacer material is used to may or may not be molded to accommodate the foot. The moisture transfer nonwoven top sheet may be eliminated in selected performance categories. The breathable spacer material abuts either a waterproof breathable membrane, an encapsulated or coated fabric. The breathable spacer material may combined with a THERMOLITE or the Foss thermal composite.

The Phase Change Technology by OUTLAST, Frisby may be added to any layer in the liner system and may be combined with encapsulated fibers and fabrics. Phase Change Technology can be used in conjunction with structurally knitted waterproof fabrics or fibers, or with the encapsulation fabrics by Nextec, Toray or the like. Encapsulation by Nextec combined with the OUTLAST Technologies is an enhance option in this embodiment, but is not essential in the products. If encapsulation is employed, then the fourth layer preferably includes THERMOLITE or the Foss thermal composite. If a non-removable liner is employed instead of a removable liner, a waterproof-breathable thin film, finishes or coating can be used instead of encapsulation or a waterproof/breathable membrane.

The sixth layer in this removable shell liner may be Cordura, STARLITE, KEVLAR fabrics or the like. The STARLITE by Faytex Corp or Faytex breathable series, Kevlar and Cordura's by Schoeller 6500, 14705, 13207, 13632, 65563 etc. and NAM LIONG's ARMORTEX Series, DERIZAX and ENTRANT Gil by Toray.

The exterior shell fabric is and preferably encapsulated or waterproofed with a breathable thin film or coating.

Alpine Cross Country Boots

A liner for the alpine cross country boots has a first layer selected from a group including polypropylene, nylon blend, polyester or polyester blends, LYCRA or wool backed by cotton, wool, rayon, lyocel, acetate, acrylic, polyester or a nonwoven blend. The inner ling fabric or material may be an anti-microbial, anti-fungal INNOVA or ALPHA; sueded polyesters; polyester field sensor; looped polyester terry; Dri-line by Milliken, DRI-LEX DOESKIN or BABY KID or the like by Faytex Corp.; polyester DRI-LEX terry by Faytex; polyester fleeced blends or spacer fabric by Malden; and polypropylene backed by cotton by Coville. Alternatively the three layer composite by Faytex, Dicon or the like may abut the second layer.

The second layer in this embodiment may be a open cell foam, or a moisture transfer nonwoven composite, or a breathable moldable spacer fabric or the outer shell material. These material may be individually selected or in combinations in certain performance categories.

The second layer is a germicidal, open cell hydrophilic foam. It may be COMFORTEMP by Frisby or DuPont with Phase Change Technologies or a foam by Dicon Technologies with or without glycerin. This foam can be provided with or without a moisture transfer nonwoven top sheet. The moisture transfer nonwoven top sheet can be selected from any of the materials previously specified. Alternatively, the second layer may be an elastomeric composite or the second layer can be a open cell foam such as DRI-Z or DuPont or the like with a fiber integrated into the foam during it's construction. This composite of fiber and foam is created in one process and may in some performance categories contain a polymer mesh such as that developed by Naltex or a webbing. The open cell foam with or without the polymer mesh may alternatively, contain a fibers nonwoven sheet constructed of the above suggested fibers contained in the nonwoven backing. The assist in the absorption and transfer of the moisture passing through the moisture transfer system.

The third layer is a structural support foam or a breathable moldable spacer material by Muller Textil. The heel and arch may also have a slow recovery foam or spacer fabric added for comfort. The thickness of the layer of foam or spacer fabric and THERMOLITE may vary for performance.

The fourth layer is a thin layer of THERMOLITE, a hollow core polyester fibers, THERMOLITE combined with a with a open cell foam with or with out nature fibers such as corn fibers added. Optionally, the third layer can be a blend of moisture transfer synthetic or nature fibers blend or the THERMALFOSS nonwoven composite with or with out DuPont thermal fibers or an open cell foam such as DuPont or the like with a moisture transfer nonwoven top sheet made of wood pulp, lyocel, rayon, cotton, polyester, acrylic, acetate, corn or polypropylene. These nonwoven fibers in combinations or independently absorb and move moisture. The fourth layer may be optional in some performance categories.

The fifth layer is optionally, a breathable waterproof/breathable membrane which may be any one of the following: SECO at Shawmut Mills, THINTECH, THERMOLITE 2000/1300 standard, laytex, breathable membranes by Harrison Technologies, Sympatex, or ENTRANT Gil by Toray The OUTLAST Membrane can be used by itself, with another membrane or with encapsulation technology on the outer shell fabric, such as Nextec, Toray or the like Alternatively, instead of the membrane, encapsulation technology or a waterproof breathable finish or film may be applied to the exterior shell materials of the sixth layer and can achieve similar results. Optionally, a combination of Phase Change Technology and encapsulation fibers or fabrics by Nextec or Toray. If encapsulation is employed, then the fourth layer preferably includes THERMOLITE, a moisture transfer nonwoven blend or THERMALFOSS composite.

The sixth layer is one of the following fabrics. Note that if these fabrics are encapsulated, the waterproof/breathable membrane in the fifth layer may not be needed in combination. These fabrics include the following: Cordura; LYCRA blends; STARLITE by Faytex Corp.; KEVLAR fabric by Schoeller (14705, 6500, 13207, 13632, 65563, etc.); NAM LIONG, AROMRTEX Series, DuPont and Toray or the like, Cordura 2000 by DuPont, Dermizax and ENTRANT Gil by Toray, 3 or 4 ply Supplex; Mojave and Tudor nylon and polyester blends by Travis; 6 ply Maxus nylon blends or the like; and synthetic leathers by Daewoo, Inc., Nextec or moisture transfer nonwovens by Freudenberg, Sisa or the like. These fabrics may be used individually or in combination.

The seventh layer is a LYCRA covered neoprene, moldable spacer fabric or slow recovery foam or reticulated open cell foam ankle cuff.

The tongue for the alpine boot is similar to the tongue of the in-line skate. The tongue of the cross country boot is similar to the snowboard boot. They can be constructed of DuPont molded foams with a moisture transfer nonwoven top sheet or moldable spacer fabrics. A slow recovery foam can also be used as specified with the snowboard boot. The inner fabric is one or more of DRI-LEX, DRI-LEX Aerospacer, polyester FIELDSENSOR polyester by Toray, Freudenberg nonwovens, DRILINE by Milliken, polyester spacer by Malden, polar fleece INNOVA or ALPHA polypropylene by Coville or Deercreek fabrics, or DRI-LEX DOESKIN nylon, polyester blends sueded or fleeced or the like. The outer tongue fabrics are high abrasive fabrics constructed of KEVLAR and Corduras by Schoellar's or NAM LIONG and DRI-LEX Aero-Spacer (or other Aerospacer materials by Faytex, or the like, and breathable synthetic and natural leathers by Daewoo, Nextec, or the like. All the leather in this embodiment can be treated with OutDry by Nextec.

Hiking Boots

A liner for the hiking boot would include the following. The first layer is selected from a group including: polyester field sensor; looped poly terry; DRI-LEX composites by Faytex; Doeskin, baby kid, Cambrelle by Faytex; anti-fungal, anti-microbial polypropylene fabrics; INNOVA or ALPHA fleeced polyester and polypropylene blends, sueded polyester blends, COOL MAX or nylon blends, or the like. Any combination of these moisture transfer fabrics can also be used.

The second layer is a cellular elastomeric composite or hydrophilic open cell foam preferably DuPont, COMFORTEMP by Frisby/Schoeller or DRI-Z by Dicon. The OUTLAST membrane is an option in this layer. If a foam is used, a moisture transfer nonwoven top sheet selected from previously mentioned materials can be attached as a backing.

The third layer is a molded hydrophilic open cell foam preferably DuPont backed by an aperture top sheet composed of cotton, polyester, polypropylene, Lyocel, rayon, or wood pulp, cotton or the like. A moldable heel and ankle spacer fabric by Muller or the like may also be used in place of the third layer of hydrophilic foam. A breathable moldable spacer fabric or foam may be added around the toe box and back cuff. A molded heel/ankle insert by Muller Textil is preferably also used.

The fourth layer optionally is a waterproof/breathable membrane which may be any one of the following: OUTLAST membrane by Gateway Technologies combined with Seco-Tex, TX1540 (distributed by Shawmut Mills), THINTECH, THERMOLITE 2000/1300 standard, Laytex, WILCOFLEX DRY or the like. The OUTLAST Technology may also be used independently of the breathable membrane and may also be coated to the outer fabric or fibers. Also, this membrane layer may be eliminated in some models depending upon the hiker's needs. Alternatively, instead of the breathable membrane, encapsulation of the fifth layer can be performed to achieve similar results. If encapsulation is employed, then the third layer may be an open cell foam or a moldable spacer fabric, a THERMOLITE, a moisture transfer nonwoven composite or a THERMALFOSS composite. The Phase Change Technology may be applied to the moisture transfer nonwoven, foam or fabric in this moisture liner system and may be combination with outer shell encapsulated fibers and fabric, such as by Nextec, or the like.

The fifth and last layer is a combination of one or more of the following: Corduras, Supplex Nylon, STARLITE, Tudor, KEVLAR, nylon blends, polyester nylon blends, and waterproof breathable synthetic and natural leathers. Preferably, this layer is waterproofed by using encapsulation, waterproof finishes or films or coatings. Waterproof treatment to the exterior shell leathers, synthetic leathers and/or materials can be applied by OUTDRY by Nextec, DURAPEL PLUS, HYPER D-WR or ENTRANT G2-XT.

Elastomeric composite technology may be insert between the exterior shell fabric and the breathable membrane if applied or the elastomeric composite may about a moisture transfer nonwoven thermal blend one side and the exterior shell fabric on the other side. Optionally, the thermal nonwoven composite may be abutting the exterior shell material. Furthermore, the breathable liner according to the present invention could also be added to clothing such as shirts, pants, gloves, helmets, backpacks etc., by omitting elements such as the structural mesh and by adjusting the number of foam material layers and their thickness. For example, clothing preferably has a wickable inner liner, followed by an elastomeric or an open cell foam 1/16, 1/8 and the outer shell fabric. A moisture transfer nonwoven may or may not be laminated to the foam. Optionally, a breathable membrane abuts the foam or moisture transfer nonwoven and is laminated to the outer fabric. The outer fabric may be waterproofed by encapsulated, laminated to a breathable waterproof membrane, coated with a waterproof finish or film, or structurally woven or knitted to repel water. If encapsulation technology or a waterproof breathable film or finish is applied to the exterior shell fabric than the breathable membrane may not be applied. Indeed, the amount of foam may be replaced by a nonwoven composite blend. Presently, this liner system is combining a open cell foam abutting a open cell foam and encapsulated outer shell fabric as one embodiment Optionally, the FossThermal, THERMOLITE or a nonwoven thermal or nonwoven composite combined with foam may be used abutting the inner ling fabric and the outer shell fabrics.

This invention can also be used for industrial and medical applications by using polyester spun bonded filter products by Tangerding Vlitesstoffe, Vitafiber, or the like, combined with alternating hydrophilic foam layers and nonwoven blends. The nonwoven composites are constructed to filter, absorb and transfer moisture and microscopic particles.

Other Applications

FIGS. 13-22 disclose various other embodiments of the present invention as follows. FIGS. 13-18 show a detachable, removable insert liner for soft shell skates and other products. These liners are inserts and can be used in hockey skates and other types of footwear. The same construction can be applied to a complete boot rather than an insert. This is shown in FIG. 19. FIG. 19 is an example of a complete skate containing the same materials as the inserts in FIGS. 13-18, and built in the same way as these inserts.

Figures 13, 13A:
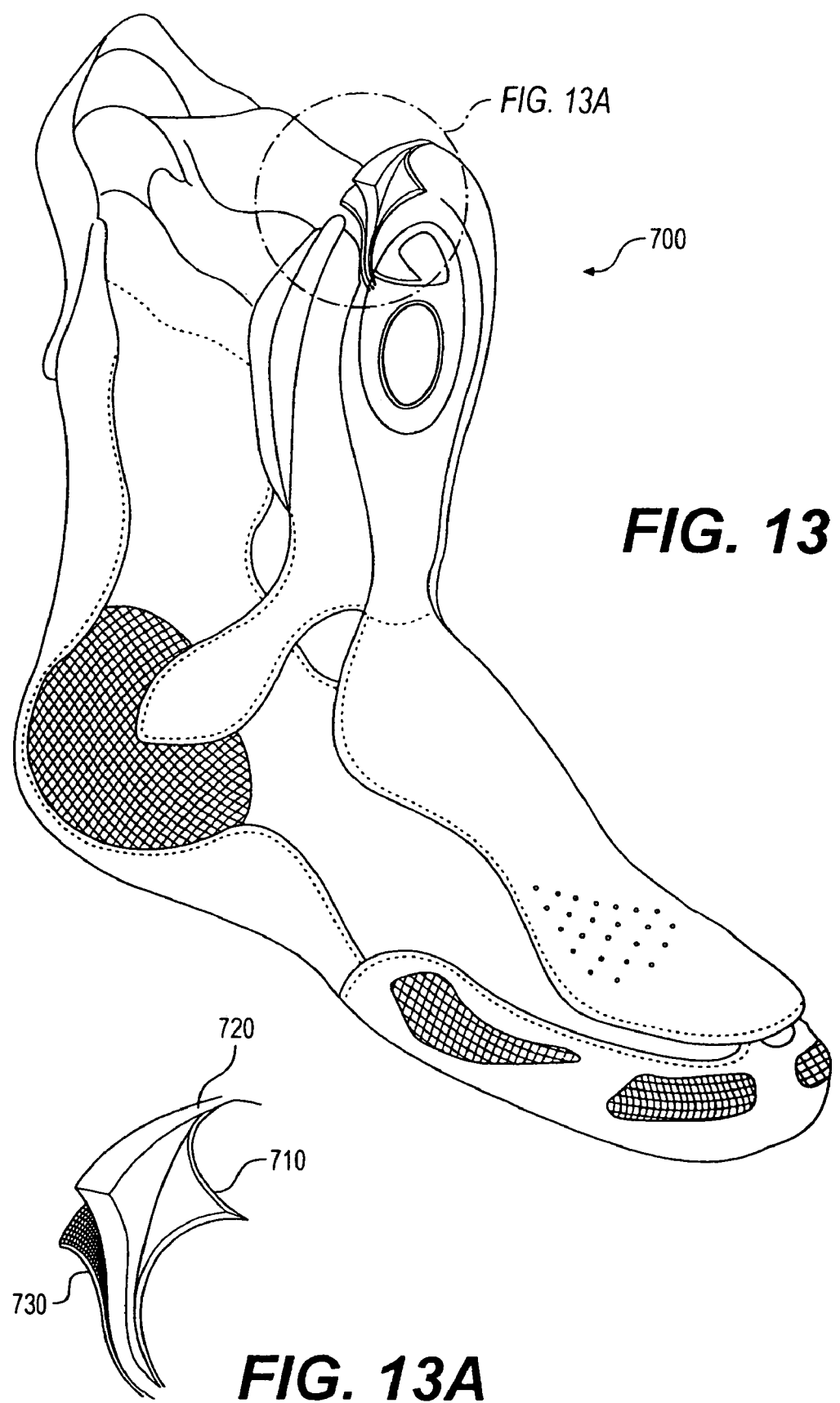
FIG. 13 illustrates an insert for an in-line skate or hockey skate with a first portion enlarged.

FIG. 13 illustrates an insert (700) for an in-line skate or hockey skate with a first portion enlarged. In FIG. 13, numeral 710 represents a composite of one layer, two layers, or three layers. 710 shows outer shell fabric, foam, nonwoven, with no top sheet/※ the top sheet is the outer shell fabric in this case. 710 can be an exterior shell fabric or material abutting a cellular elastomeric composite, or the fabric can be backed by a flocked fiber combination abutting the foam and followed by a nonwoven or a knit. Alternatively, the same combination may be used without flocking. Optionally, layer 710 can be a single layer of fabric or material, or a double layer, including fabric or material abutting a nonwoven. Preferably, the composite layer is a 3 layer construction of fabric, foam, and nonwoven. Layer 720 is a spacer fabric. Optionally, layer 720 is a combination which may include multiple layers of foam and nonwoven. In some performance categories, 720 can be simply a foam or a nonwoven. Layer 730 is a nonwoven, or a cellular elastomeric composite or an inner lining fabric or material such as a knit.

Figures 14, 14A:
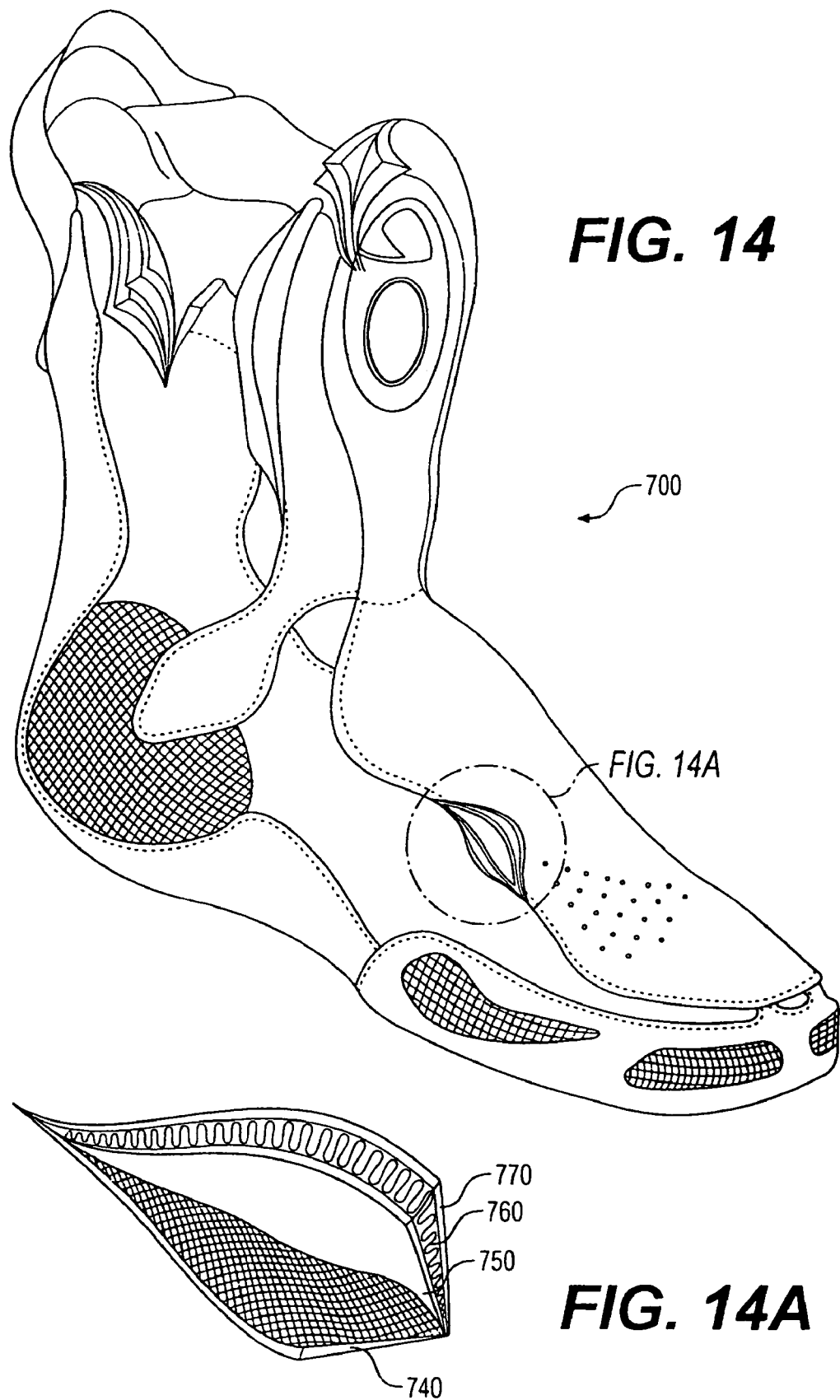
FIG. 14 illustrates another embodiment of an insert for an in-line skate or hockey skate with a second portion enlarged.

FIG. 14 illustrates another embodiment of an insert (700) for an in-line skate or a hockey skate with a second portion enlarged. 740 illustrates a one, two, or three layer composite. The top sheet can be optionally composed of: 1) a nonwoven or a knitted layer; 2) a nonwoven or a knit and a foam; 3) a nonwoven or a knit with a cellular elastomeric composite; 4) a nonwoven and a foam composite. Layer 750, 760 and 770 together compose a spacer fabric or a moldable foam with a mesh. Optionally the spacer fabric or foam with a moldable mesh may include a nonwoven thermal such as Thinsulite or Thermolite with or with out silver fibers by Foss Manufacturing or the like or a thermal composite made of nonwoven fiber blends and silver fibers The preferable construction replaces the 3 layers (750, 760, and 770) with a single layered spacer fabric. In some multilayer constructions, the specific layers could be broken down as follows: 1) layer 750 may be a knit, woven, nonwoven construction, or foam, or an elastomeric composite; 2) layer 760 may be a foam, nonwoven or a combination of foam and nonwoven; 3) layer 770 may be a knit, woven, nonwoven, foam, or an elastomeric composite.

FIG. 15 illustrates another embodiment of an insert (700) for an in-line skate or hockey skate with a third portion enlarged. 780 could be a combination of an outer fabric and a foam or a combination of an outer fabric a foam and a non-woven. 782 has many options. One combination is a foam with a mesh, a non-woven, another foam, and another non-woven. A second combination has a foam, a mesh, a non-woven, a second foam, and a second non-woven. A third combination is a non-woven, a foam, a second non-woven and a non-woven composite manufactured by Foss. Optionally, all nonwoven layers may be a cellular elastomeric composite, and may include silver fibers by Foss Manufacturing.

784 has three options. One option is a spacer fabric. A second option is a moldable foam. The third option is a combination of a foam and a polymer mesh, manufactured by Naltex.

786 has the following options. It could be an outer fabric plus a foam or a foam and non-woven composite (Foss composite). Another option is an outer fabric and an elastomeric composite. Finally, 786 could be a Foss composite and an elastomeric composite together with an outer shell fabric. In some performance products the layers of 782 are omitted. It should be noted here that all composite materials can be backed by a flocked fiber blend which may contain silver fibers.

FIG. 16 illustrates an insert (800) for a soft-shell alpine boot with first and second portions enlarged. 802 illustrates a composite including an inner moisture transfer material, a foam and a nonwoven. 802 may also be an inner moisture transfer material, abutting a nonwoven and foam composite or a cellular elastomeric composite. 804 illustrates a composite of a nonwoven a foam, a second nonwoven and a second foam. Alternatively, 804 may be composed of a foam and a nonwoven with silver fibers (this combination is an example of a moisture transfer thermal), and in some performance categories a cellular elastomeric composite may be combined with a moisture transfer thermal. This whole layer can be eliminated in some performance categories. Nonwovens in this composite may be replaced by a knitted fabric. 806 illustrates a spacer fabric or a breathable moldable foam. The moldable foam may include a polymer mesh, with or without silver fiber blends, or other fiber blends including wool fibers. In one option the silvers and natural blends abut the spacer fabrics and may be followed by a thermal nonwoven layer. Thermal nonwovens such as Thinsulite and Thermolite he like may include the silver fibers by Foss manufacturing. Layer 806 is a moisture transfer thermal composite composed of a nonwoven, and foam blend. The foam with mesh can be followed by a nonwoven or another foam. The foam nonwoven composite may be constructed in the following ways: 1) foam-nonwoven-foam; 2) nonwoven-foam-nonwoven; 3) nonwoven-foam-nonwoven-foam-spacer fabric; 4) nonwoven-foam-nonwoven-spacer fabric. All of these combinations may include silver fibers or fiber blends and are considered moisture transfer thermals. In some options, the nonwoven layer may be replaced with a knitted layer, or a cellular elastomeric composite. 808 illustrates a cellular elastomeric composite or a foam and nonwoven abutting an exterior shell fabric. The moisture transfer thermal composite may be combined with a polymer mesh and the exterior shell fabric in layer 808. Alternatively 808 can be the exterior shell fabric open cell foam with or without silver fibers or fiber blends abutting a nonwoven, a nonwoven thermal blend or a nonwoven and foam composite. This exterior shell composite is moldable, transfers moisture, and regulates temperature with fiber additions. The exterior shell fabric may be waterproofed in the following ways: 1) with encapsulation; 2) with breathable membrane; 3) with waterproof breathable film or finish; 4) with fibers treated or constructed to repel water. A preferable three-layer construction for golf shoes, running shoes, cross-country boots and apparel includes a waterproof exterior shell fabric, an open cell foam, or a cellular elastomeric composite abutting a knitted or nonwoven inner moisture transfer material. Optionally the foam, nonwoven or cellular elastomeric composite may include blends containing either silver or wool fibers, or both.

FIG. 16 also illustrates in layer 910 a spacer fabric abutting layer 912. Optionally, 910 can be a foam with a fiber blend and polymer mesh added. 912 is preferably a moisture transfer thermal, composed of a foam nonwoven antimicrobial blend with silver fibers. Alternatively, 912 can be a nonwoven thermal without foam or a thermal nonwoven with silver fibers. 914 is a one-, two-, or three-layer composite. It can be an outer shell fabric or material, abutting a breathable foam followed by a nonwoven. Alternatively, the outer shell fabric may abut a cellular elastomeric composite or thermal nonwoven.

Figure 17:
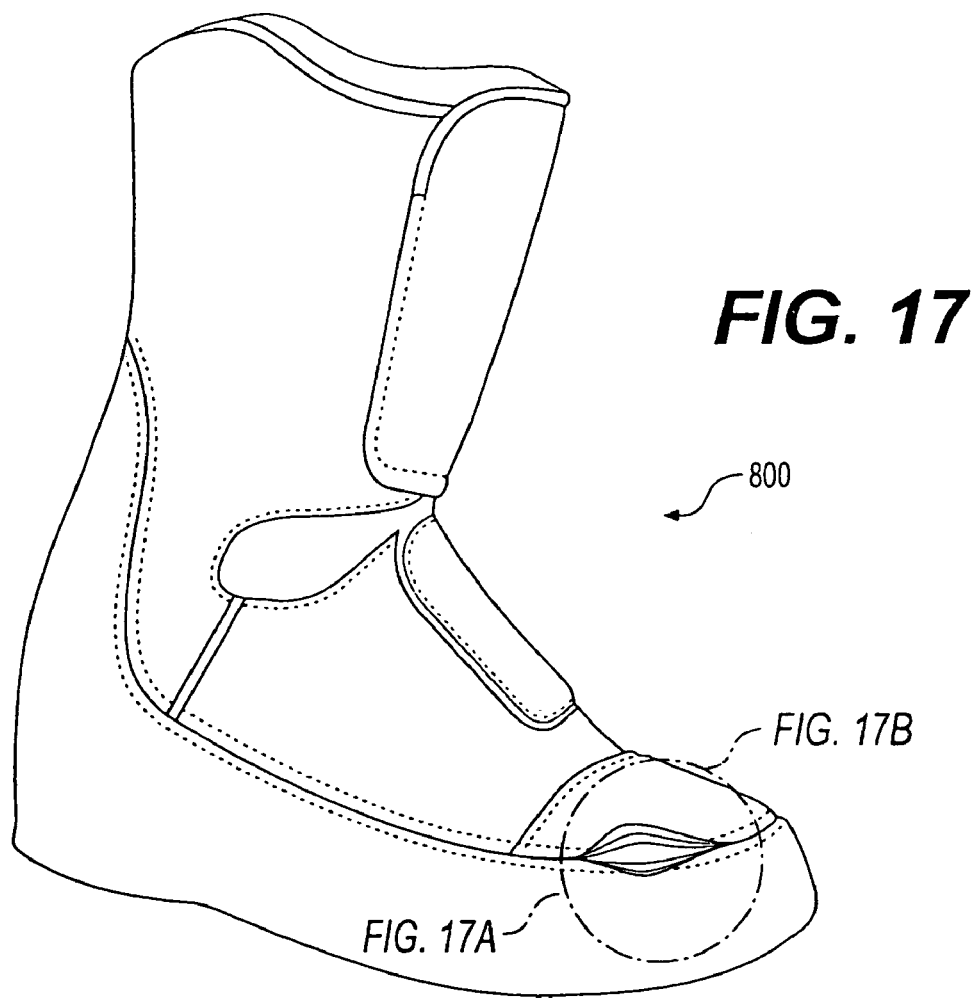
FIG. 17 illustrates an insert for a soft-shell alpine boot with a second portion enlarged.
Figure 17A:
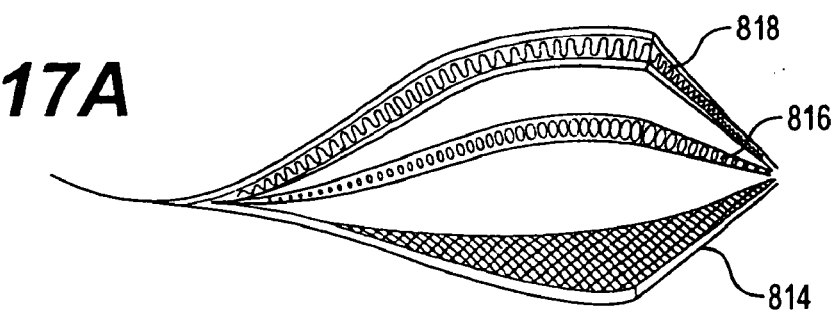
Figure 17B:
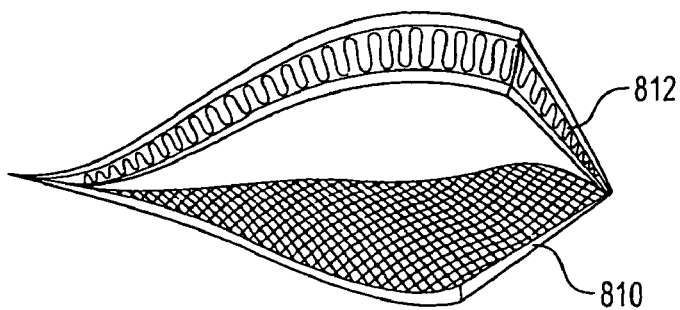

FIG. 17 illustrates an insert (800) for a soft shell alpine boot with a second portion enlarged. 810 represents an outer shell fabric, a foam and a nonwoven composite. The 810 layer is preferably moldable antimicrobial thermal breathable, and transfers moisture. The 810 layer can be developed in a number of constructions. Layer 812 can be an outer shell fabric and a breathable foam, an outer shell fabric a breathable foam and a nonwoven, or an outer shell fabric and a cellular elastomeric composite, or outer shell fabric and a moisture transfer thermal with or without foam. Layer 812 is a spacer fabric, which can optionally be a breathable foam with or without a polymer mesh and silver fibers or fiber blends. Layer 812 can be optionally be a moisture transfer thermal moldable nonwoven composite, and in some performance categories the foam can be replaced with a cellular elastomeric composite included in the nonwoven layer. Layer 810 and layer 814 are similar to each other in this three-layer construction. Optionally, layer 814 can be a two-layer construction. Layer 814 illustrates a composite with an outer shell fabric and a foam, or an outer shell fabric and a nonwoven, or an outer shell fabric and a foam, or an outer shell fabric and a cellular elastomeric composite. Preferably layer 814 is an outer shell fabric and a moisture transfer thermal composite including breathable foam and silver fibers. Layer 816 is a moisture transfer thermal nonwoven inserted between the options in layer 814 and a spacer fabric in layer 818, or a foam with or without a polymer mesh. Optionally, layer 816 can be a foam nonwoven composite or a cellular elastomeric composite. This multi-layered composite abuts an inner lining material and forms the moldable liner insert or permanently attached liner. In some options, this liner may incorporate 3-15 layers. The spacer fabric in layer 818 can optionally be a foam a nonwoven or a combination. Layer 18 may also be a foam with a moldable polymer mesh.

FIG. 18 illustrates a soft shell alpine boot (900) including inserts such as that shown in FIGS. 16 and 17. In the enlarged portion of FIG. 18, 820 illustrates an inner lining material. 822 illustrates a foam nonwoven composite and optionally 822 may be a cellular elastomeric composite or a breathable foam. Layer 824 illustrates a polymer mesh. The polymer mesh in 824 can be included in a foam, or in a nonwoven, or in a foam and nonwoven composite, or alternatively it may abut layers with any of these constructions. One option, layer 820 abuts a cellular elastomeric composite including a polymer mesh. Layer 826 illustrates another inner lining material. 826 may alternatively be a nonwoven and a cellular elastomeric composite or a knitted construction and a breathable foam or a three-layer composite composed of an inner lining material, a foam and a nonwoven. Preferably, the pouter shell soft boot composite is composed of an outer shell fabric, a frothed open cell foam, a moisture transfer nonwoven, or nonwoven composite and an inner lining material. This composite is moldable, transfers moisture, and is thermal and waterproof.

FIG. 19 illustrates a soft shell alpine boot (900) including inserts such as that shown in FIGS. 16 and 17. In the enlarged portion of FIG. 18, 830 illustrates an inner lining material. 832 illustrates a foam nonwoven composite and optionally 832 may be a cellular elastomeric composite or a breathable foam. Layer 834 illustrates another inner lining material. 834 may alternatively be a nonwoven and a cellular elastomeric composite or a knitted construction and a breathable foam or a three-layer composite composed of an inner lining material, a foam and a nonwoven. Preferably, the pouter shell soft boot composite is composed of an outer shell fabric, a frothed open cell foam, a moisture transfer nonwoven, or nonwoven composite and an inner lining material. This composite is moldable, transfers moisture, and is thermal and waterproof.

FIG. 20 illustrates a polymer shell for a hockey skate 960 including a moisture transfer liner.

FIG. 21 illustrates a soft shell inline skate (950) incorporating any of the inserts of FIGS. 13-15. The soft shell inline skate does include some polymer shell materials identified in 920. Similar material also forms a part of the soft shell alpine boot of FIG. 18 although not explicitly identified. In some options, the polymer shell material in 920 can be eliminated from the soft alpine or skate boot, and in other options the shell material may be increased to provide more support.

All nonwovens, foams, fabrics, materials or composites can have fibers flocked to either one or both sides. The flocked fiber blend may include silver fibers by Foss Manufacturing Co.

While the present invention has been described above in connection with the preferred embodiments, one of ordinary skill in the art would be enabled by this disclosure to make various modifications to the disclosed embodiments and still be within the scope and spirit of the present invention as recited in the appended claims.

Any composite constructions or combination of composites in this application may be applied to technical apparel, casual sportswear, protective clothing, snowboard or biking helmets, accessories, in-line skates, ice skates, hockey skates, medical and may have industrial applications.

The invention claimed is:

1. A moisture transfer composite comprising:
a moisture transfer breathable material (MTBM) attached to a moisture transfer, breathable, absorbent, elastomeric cellular composite comprised of nonwoven fibers and a foam material formed in a single process and being flocked on a side opposite the MTBM with a flock fiber blend comprised of synthetic, shaped, hollow fibers and silver fibers to form a moisture transfer, absorbent surface, wherein the moisture transfer, absorbent, flocked fiber blend includes phase change materials.

2. The moisture transfer composite according to claim 1, wherein the elastomeric cellular composite wherein the synthetic, shaped, hollow fibers are polyester fibers.

3. A moisture transfer, breathable, absorbent composite comprising:
a breathable, absorbent, chemically ionized moisture transfer material; and
a moisture transfer, breathable, absorbent nonwoven material comprised of shaped, hollow, synthetic fibers, and elastic and silver fibers combined with thermally regulating phase change materials (PCMs).

4. The moisture transfer, breathable, absorbent composite according to claim 3, wherein the nonwoven material includes a breathable, open cell foam material.

5. A moisture transfer, breathable, absorbant nonwoven material according to claim 3, wherein the nonwoven material abuts a breathable, absorbent, open cell foam layer.

6. The moisture transfer, breathable, absorbent composite according to claim 3, wherein the nonwoven fibers are comprised of shaped, hollow, stretch synthetic fibers and at least one of natural wool, cotton, corn, woodpulp, or lyocell fibers.

7. A waterproof, breathable, moisture transfer soft shell moldable composite for technical apparel or footwear comprising:
a waterproof exterior soft-shell woven or knitted material;
a breathable, absorbent, moisture transfer, anti-microbial, open-cell foam material mechanically bonded to a breathable, absorbent, moisture transfer non-woven fiber blend comprised of shaped, hollow, synthetic fibers, elastic and silver fibers and natural fibers; and
an inner moisture transfer, breathable, absorbent, chemically ionized fabric or material.

8. A waterproof, breathable, moisture transfer soft shell moldable composite according to claim 7, wherein the exterior shell woven or knitted material has at least one of a waterproof finish or film, encapsulation, or a breathable membrane.

9. A waterproof, breathable, moisture transfer soft shell moldable composite according to claim 7, wherein the at least one layer contains phase change materials (PCMs).

* * * * *

UNITED STATES PATENT AND TRADEMARK OFFICE
CERTIFICATE OF CORRECTION

| | | |
|---|---|---|
| PATENT NO. | : 7,314,840 B2 | Page 1 of 1 |
| APPLICATION NO. | : 11/341374 | |
| DATED | : January 1, 2008 | |
| INVENTOR(S) | : Baychar | |

It is certified that error appears in the above-identified patent and that said Letters Patent is hereby corrected as shown below:

Column 3, line 33, change "elastine" to --elastane--

Column 12, line 25, change "ELASTIC" to --ELASTANE--

Column 15, line 49, change "elastine" to --elastane--

Column 16, line 36, change "ELASTIC" to --ELASTANE--

Column 19, line 26, change "elastic" to --elastane--

Column 33, line 22, change "elastic" to --elastane--

Column 34, line 14, change "elastic" to --elastane--

Signed and Sealed this
First Day of January, 2013

David J. Kappos
*Director of the United States Patent and Trademark Office*